(12) United States Patent
Mizuo

(10) Patent No.: US 10,447,189 B2
(45) Date of Patent: Oct. 15, 2019

(54) ELECTRIC MOTOR CONTROL DEVICE, ELECTRIC MOTOR SYSTEM AND ELECTRIC MOTOR CONTROL METHOD

(71) Applicant: CANON KABUSHIKI KAISHA, Tokyo (JP)

(72) Inventor: Yoshihiro Mizuo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 152 days.

(21) Appl. No.: 15/667,766

(22) Filed: Aug. 3, 2017

(65) Prior Publication Data

US 2018/0069496 A1 Mar. 8, 2018

(30) Foreign Application Priority Data

Sep. 6, 2016 (JP) ................................. 2016-173847

(51) Int. Cl.
| | |
|---|---|
| *H02P 7/30* | (2006.01) |
| *H02P 6/08* | (2016.01) |
| *H02P 7/02* | (2016.01) |
| *H02P 23/18* | (2016.01) |
| *H02P 8/18* | (2006.01) |

(52) U.S. Cl.
CPC ............... *H02P 7/305* (2013.01); *H02P 6/08* (2013.01); *H02P 7/02* (2016.02); *H02P 8/18* (2013.01); *H02P 23/18* (2016.02); *H02P 2209/11* (2013.01)

(58) Field of Classification Search
CPC ........ H02P 7/305; H02P 6/08; H02P 2209/11; H02P 23/18; H02P 7/02
See application file for complete search history.

(56) References Cited

U.S. PATENT DOCUMENTS

| 2011/0234144 A1* | 9/2011 | Maekawa | ............... H02P 23/04 318/702 |
|---|---|---|---|
| 2014/0035496 A1* | 2/2014 | Mizuo | ...................... H02P 6/15 318/400.17 |
| 2014/0265992 A1 | 9/2014 | Mizuo | |

FOREIGN PATENT DOCUMENTS

JP 2014-045646 A 3/2014

* cited by examiner

*Primary Examiner* — Kawing Chan
*Assistant Examiner* — Bradley R Brown
(74) *Attorney, Agent, or Firm* — Venable LLP

(57) ABSTRACT

An electric motor control device includes a drive waveform generating unit configured to generate a drive waveform (a sine wave or a pseudo-trapezoidal wave) to an electric motor. A plurality of photo interrupters detect a rotational phase of an electric motor, and a information of rotational speed is detected by an encoder circuit based on a detected signal of the rotational phase of the electric motor. The control unit controls the drive waveform generating unit on the basis of detection information of the rotational phase of the electric motor and performs control so that a phase relationship between the rotational phase of the electric motor and the phase of the drive waveform is kept constant. Furthermore, the control unit sets an amplitude value of the drive waveform generated by the drive waveform generating unit in accordance with a difference between a target speed and the detected information of rotational speed and performs speed control so that a speed of the electric motor is kept constant. The control unit calculates an amplitude setting value with which correction for suppressing non-linearity is performed in a region in which an amplitude setting value of the drive waveform and actual work given to the electric motor is non-linear and controls the speed.

12 Claims, 18 Drawing Sheets

FORWARD DIRECTION

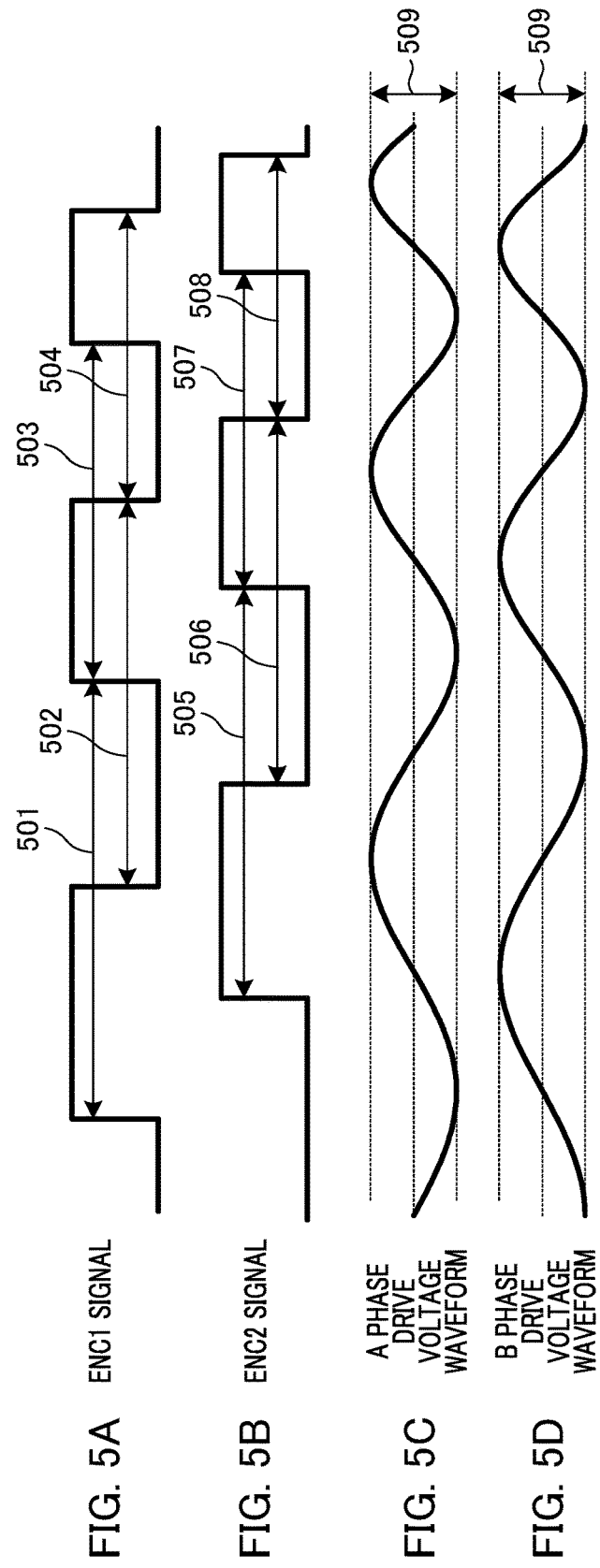

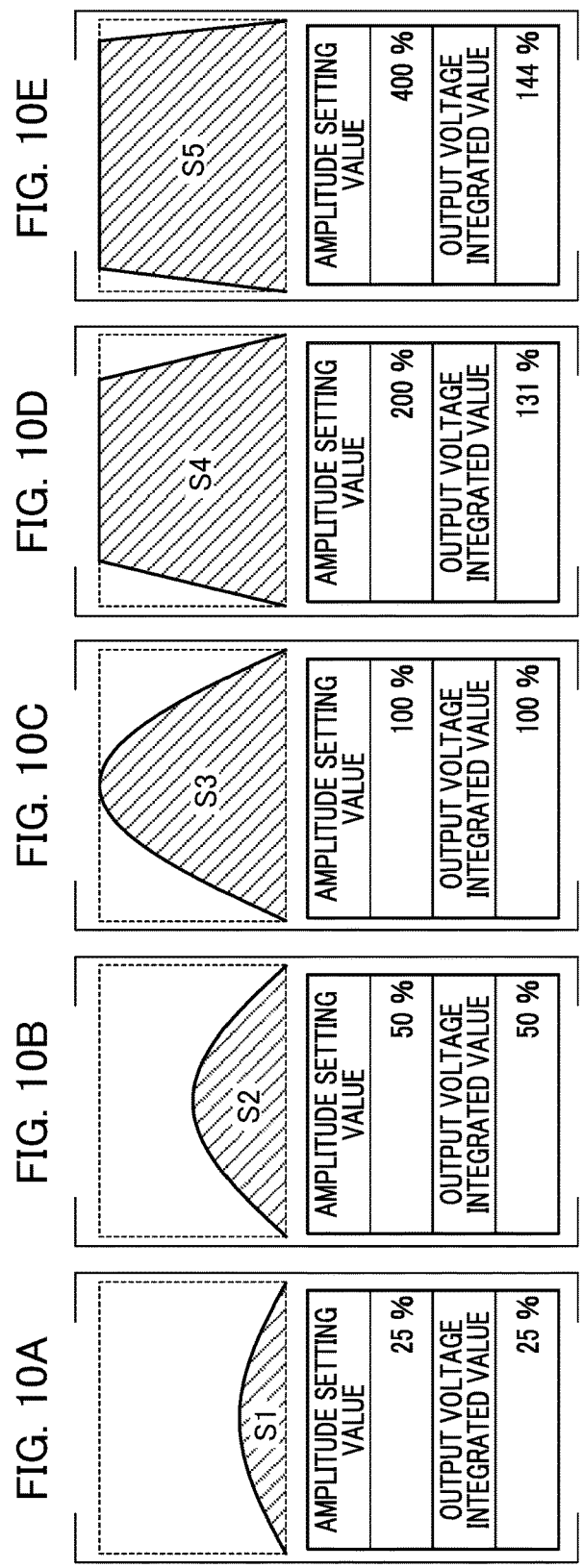

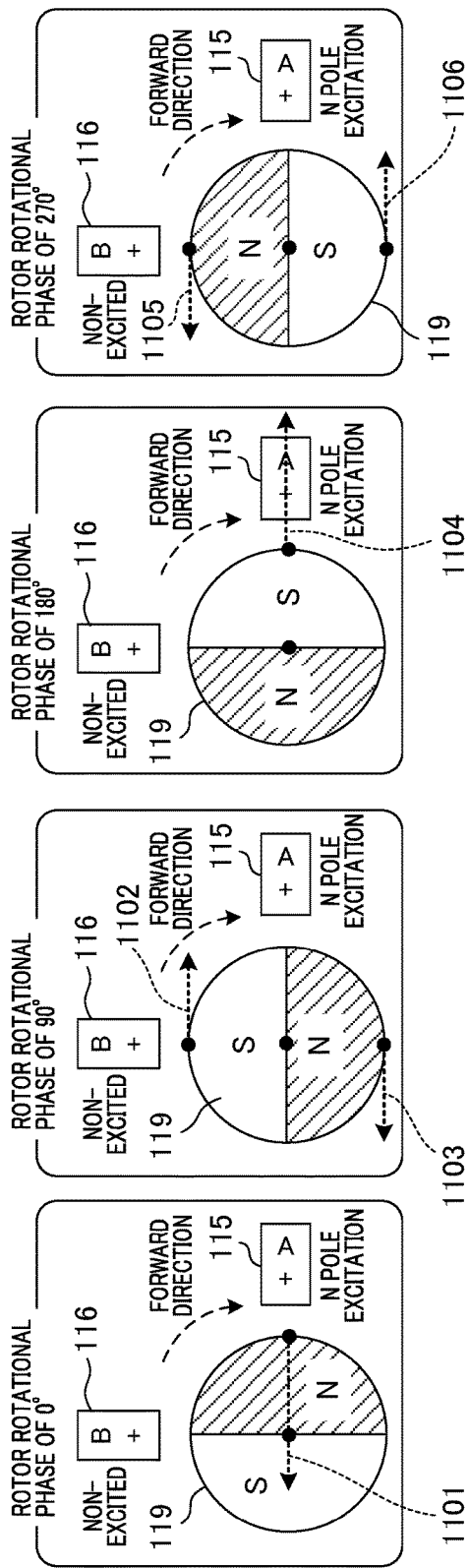

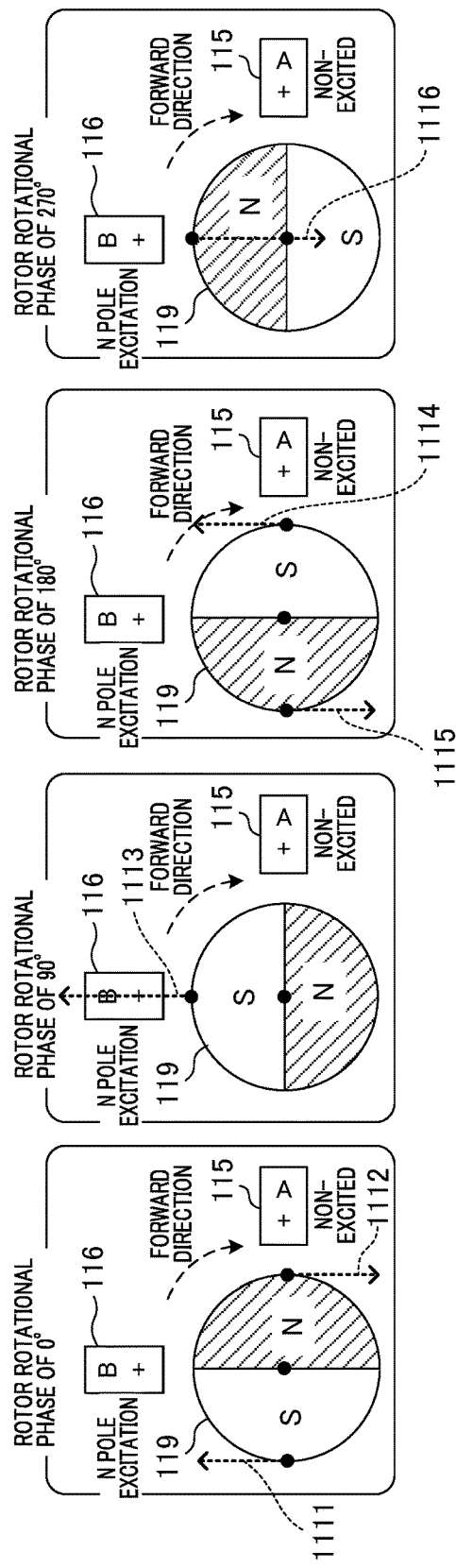
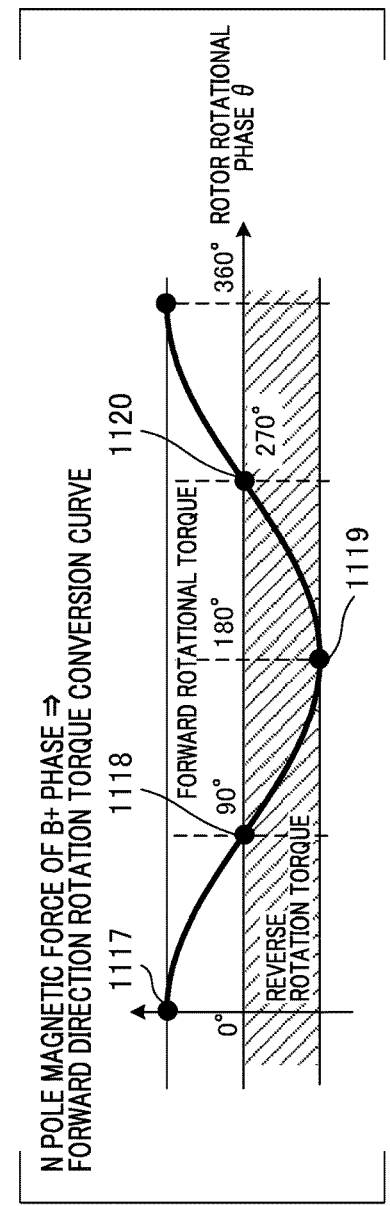

ELECTRIC MOTOR CONTROL DEVICE, ELECTRIC MOTOR SYSTEM AND ELECTRIC MOTOR CONTROL METHOD

BACKGROUND OF THE INVENTION

Field of the Invention

The present invention relates to speed control according to a change in shape of a drive waveform with respect to an electric motor.

Description of the Related Art

Control techniques in stepping motors include a technique for realizing high efficiency driving or high speed driving on the basis of a rotational position detected using a mechanism configured to detect a rotational position of a rotor. According to this technique, stepping motors behave similarly to direct current (DC) motors, a speed is increased when a load is lowered, and the speed is decreased when the load is increased. A speed of the motor at a time of high speed driving can be controlled by increasing and decreasing an amount of input voltage.

Japanese Patent Laid-Open No. 2014-45646 includes installing two sensors configured to be exchanged between two values depending on rotation of a motor shaft, identifying a magnetized phase of a rotor magnet from times at which outputs of the sensors are changed, and performing control so that a phase difference between the magnetized phase of the rotor magnet and a sine wave drive waveform is kept constant. At this time, speed control is realized by increasing and decreasing an amplitude of a sine wave voltage waveform applied to a stepping motor.

Speed control in the related art is based on the fact that a relationship between a sine wave drive voltage and an amplitude setting value of a sine wave is linear. Thus, control for the purpose of targeted characteristics in control design cannot be realized in some cases when a relationship between the amplitude setting value and work by which a drive waveform is given to a motor is non-linear (hereinafter referred to as a "non-linear relationship"). For example, it is assumed that a parameter design of a controller is determined at a speed in a region in which a non-linear relationship is obtained. In this case, control in a region in which a relationship between an amplitude setting value and work by which a drive voltage waveform is given is linear (hereinafter referred to as a "linear relationship") is likely to oscillate. On the other hand, there is a concern about a lengthened convergence time of control in a region in which a non-linear relationship is obtained when a parameter design of the controller is performed in a region in which a linear relationship is obtained.

SUMMARY OF THE INVENTION

The present invention suppresses non-linearity in control using deformation of a drive waveform in speed control of an electric motor.

An electric motor control device according to an embodiment of the present invention include: a generating unit configured to generate a drive waveform to an electric motor;
a position detecting unit configured to detect a rotational phase of the electric motor and to output a detected signal; a speed detecting unit configured to detect information of a rotational speed of the electric motor based on the detected signal output by the position detecting unit; and a control unit configured to control a phase relationship between the rotational phase of the electric motor and a phase of the drive waveform and set an amplitude of the drive waveform corresponding to a difference between a target speed and the information of rotational speed detected by the speed detecting unit to control a speed of the electric motor, wherein the control unit holds data indicating characteristics of an amplitude of a drive waveform corresponding to an output of the electric motor and performs correction on a setting value of the amplitude based on the data.

Further features of the present invention will become apparent from the following description of exemplary embodiments with reference to the attached drawings.

BRIEF DESCRIPTION OF THE DRAWINGS

FIGS. 5A to 5D are diagrams illustrating driving in a closed loop in an embodiment in the present invention.

FIGS. 10A to 10G are diagrams illustrating relationships between amplitude setting values and outputs in the drive waveforms of Example 1.

FIGS. 12A to 12E are diagrams for describing a principle of a generation of rotational torque associated with an N pole magnetic force of an A+ phase in an electric motor.

FIGS. 13A to 13E are diagrams for describing a principle of a generation of rotational torque associated with an N pole magnetic force of a B+ phase in an electric motor.

DESCRIPTION OF THE EMBODIMENTS

Hereinafter, preferable embodiments of the present invention will be described in detail on the basis of the accompanying drawings. Although an electric motor control device and an electric motor control method will be described by exemplifying an electric motor including a magnetized rotor and a field armature in this embodiment, the present invention can be applied to control of electric motors having other configurations.

Figure 1:
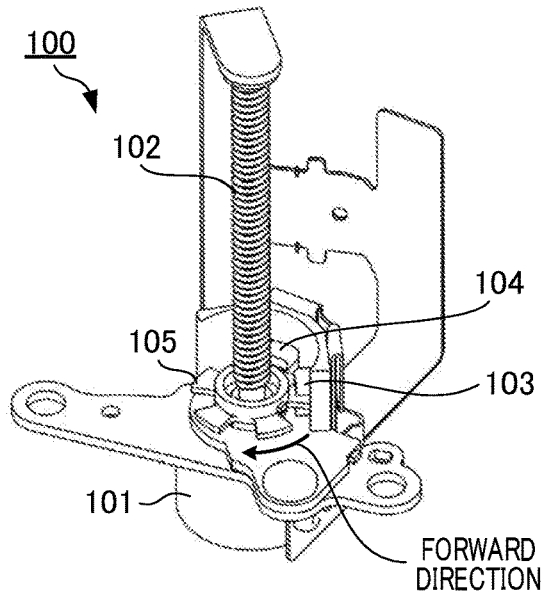
FIG. 1 is a diagram showing a motor unit including a position detection sensor in the present invention.

FIG. 1 is an exterior diagram of a motor unit 100 controlled by an electric motor control device according to an embodiment in the present invention. The motor unit 100 includes a stepping motor 101, and a rotor shaft 102 includes a slit rotating plate 105. The slit rotating plate 105 is designed to have a 50:50 ratio of bright regions and dark regions. A ch1 photo interrupter 103 and a ch2 photo interrupter 104 are optical detecting means for optically detecting bright regions and dark regions on the slit rotating plate 105 serving as a part to be detected. The slit rotating plate 105 rotates along with rotation of the rotor shaft 102, and output signals of the photo interrupters are changed thereby. Hereinafter, a ch1 photo interrupter used for detecting a rotational position of the rotor shaft 102 is referred to as a ch1-PI and a ch2 photo interrupter is referred to as a ch2-PI.

Figure 2:
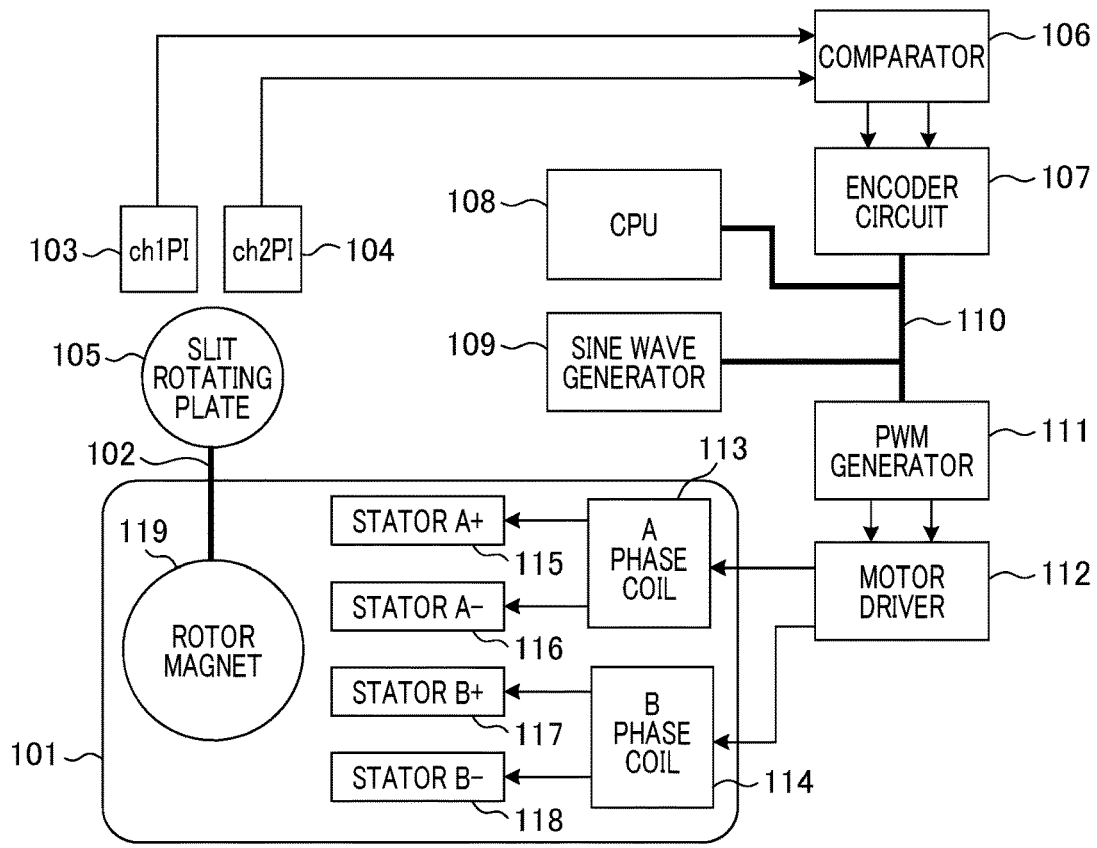
FIG. 2 is a diagram illustrating an overview of a motor control system in the present invention.

FIG. 2 is a configuration diagram of a system including a driving electrical circuit. Units indicated by reference numerals 101 to 105 are as described above. A comparator 106 compares analog input signals from the ch1-PI 103 and the ch2-PI 104 with set threshold value voltages to output binarized signals. In this embodiment, it is assumed that a threshold value is adjusted in advance such that a ratio of H (HIGH) levels and L (LOW) levels in outputs of the comparator 106 is 50:50 in a state in which a motor rotates at a constant speed without uneven rotation. Here, a first detection signal obtained by binarizing a signal of the ch1-PI 103 is referred to as an ENC1 signal, and a second detection signal obtained by binarizing a signal of the ch2-PI 104 is referred to as an ENC2 signal. An encoder circuit 107 acquires timing information when the ENC1 signal and the ENC2 signal are changed and counts positions and signal cycles using such signals. In an encoding process, four types of signals, such as a rising and a falling of the ENC1 signal and a rising and a falling of the ENC2 signal, are distinguished, and interruption is performed by a central processing unit (CPU) 108 at each signal input time. At this time, the CPU 108 determines four types of signals associated with an interrupt factor.

The CPU 108 has a function of executing a program which is stored in advance and can access the encoder circuit 107, a sine wave generator 109, and a pulse width modulation (PWM) generator 111 via a bus 110. The sine wave generator 109 has a table value of 512 resolutions with respect to one cycle of a sine wave. The sine wave generator 109 sends a PWM value corresponding to a table value to the PWM generator 111, and a motor driver 112 amplifies the PWM signal output by the PWM generator 111 and transfers the PWM signal to the stepping motor 101. Signal transferring from the sine wave generator 109 to the stepping motor 101 and outputting of the ENC1 signal and the ENC2 signal will be described in detail using FIGS. 3A to 4C.

Figure 3A:
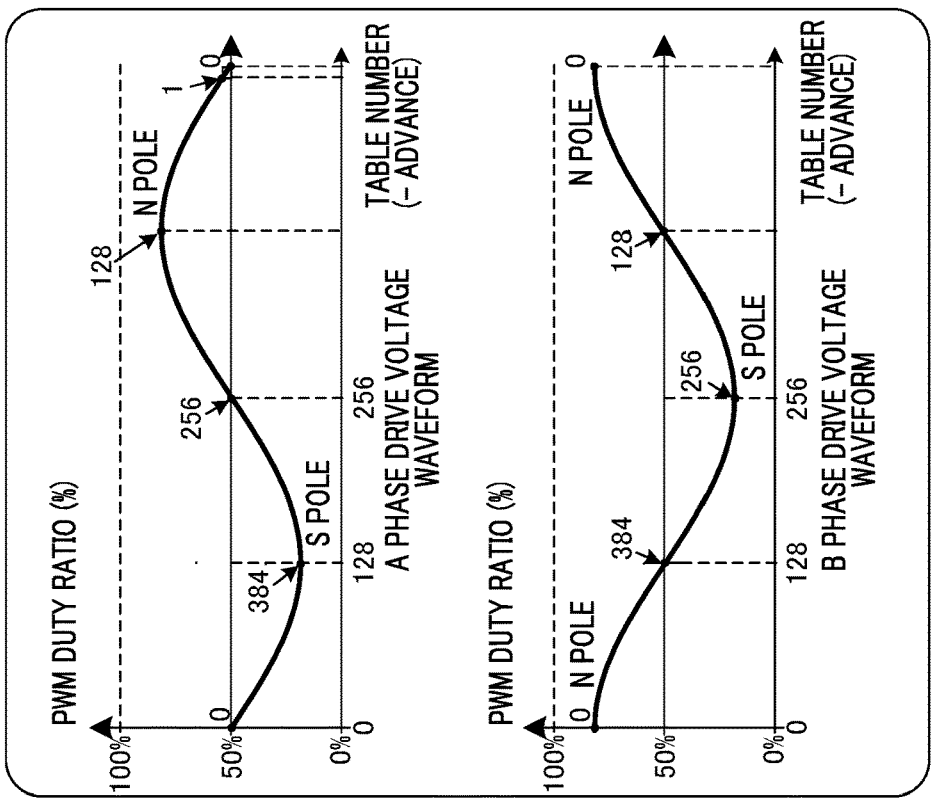
FIGS. 3A and 3B are diagrams for describing a sine wave generator in an embodiment in the present invention.
Figure 3B:
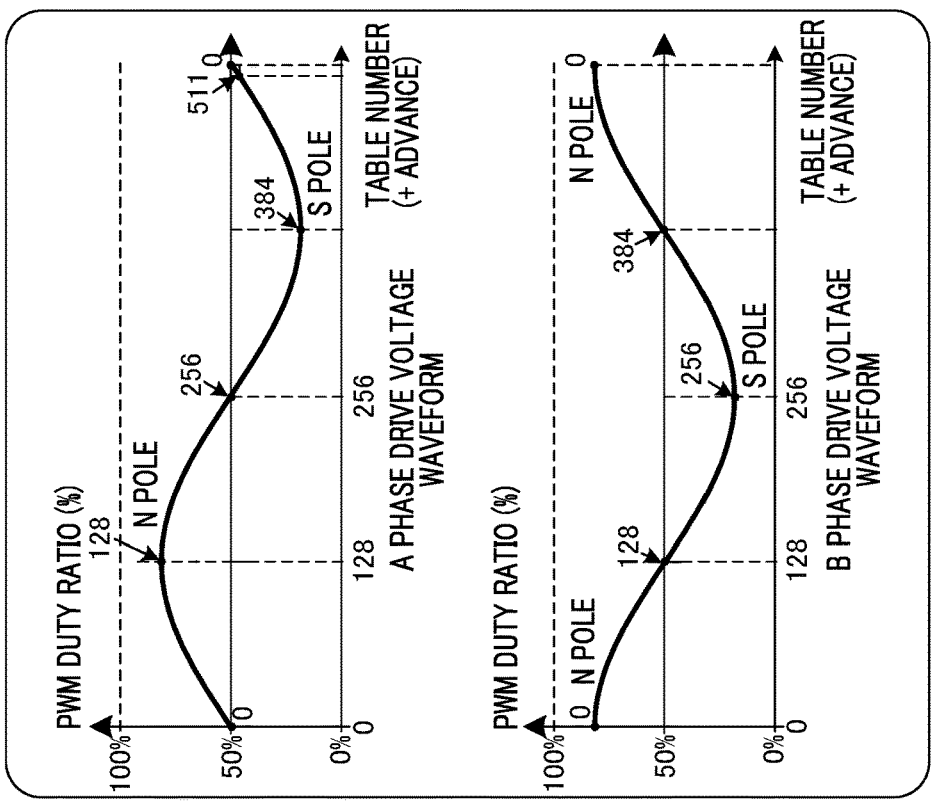

FIGS. 3A and 3B are diagrams illustrating details of sine wave tables. Table number 0 corresponds to a 0° phase in a sine wave, and table number 256 corresponds to a 180° phase in the sine wave. A value in which a duty ratio of a PWM output is 50% is stored at a position of table number 0. In addition, this is a setting by which electricity conducted to a motor coil is substantially 0 V. Values of duty ratios in PWM outputs according to phases in the sine wave are stored at positions of subsequent table numbers. In an example in FIGS. 3A and 3B, since a value of +Vcc is output if a value of a duty ratio is 100%, a peak of a table value is set to a value less than 100% so that a gain of a sine wave can be changed at any time. A sine waveform voltage signal can be effectively applied to a motor coil using a PWM signal. Hereinafter, for the sake of simplicity of explanation, an applied voltage to a motor coil is assumed to be handled as a sine wave. Here, description thereof will be provided by referring back to FIG. 2.

The stepping motor 101 has an A phase coil 113 and a B phase coil 114 and receives sine wave signals emitted from the motor driver 112. The A phase coil 13 causes stators A+ 115 and stators A− 116 to generate sine wave voltages, and the B phase coil 114 causes stators B+ 117 and stators B− 118 to generate sine wave voltages. Thus, four types of sine wave voltages with different phases can be generated.

Voltage waveforms of A phases and B phases, applied voltages to the stators, stop positions of a rotor, and rotating plate positions at this time will be described in detail using FIGS. 4A to 4C. FIG. 4A is a schematic diagram of an internal structure of the stepping motor 101 illustrated as an example. The number of pole pairs in a rotor magnet 119 is 5 (10 poles), and the stators are provided in the vicinity of the rotor magnet 119 every physical angle of 18°. A forward direction is set to a clockwise direction.

The stators A+ 115, the stators A− 116, the stators B+ 117, and the stators B− 118 are periodically disposed about a motor shaft. The stators A+ 115 and the stators B+ 117 generate a magnetic force of an N pole when a voltage applied to a coil is in a sine waveform positive region. Furthermore, the stators A− 116 and the stators B− 118 generate a magnetic force of an S pole when the voltage applied to the coil is in the sine waveform positive region. In sine waveforms shown in FIGS. 3A and 3B, positive regions are designated by N poles and negative regions are designated by S poles with respect to a duty ratio of 50%. This indicates generated magnetic forces with respect to the stators A+ 115 and the stators B+ 117. With regard to the stators A− 116 and the stators B− 118, positive regions are designated by S poles and negative regions are designated by N poles with respect to the duty ratio of 50%.

As described above, when signals of A phase drive voltage waveforms and B phase drive voltage waveforms shown in FIG. 3A are applied to the A phase coil and the B phase coil, the rotor magnet 119 rotates in the forward direction shown in FIGS. 1 and 4A. Furthermore, when signals of A phase drive voltage waveforms and B phase drive voltage waveforms shown in FIG. 3B are applied to the A phase coil and the B phase coil, the rotor magnet 119 rotates in a reverse direction opposite to the forward direction shown in FIGS. 1 and 4A. The rotor magnet 119 is moved forward in accordance with a table number in a positive direction at a time of forward rotation so that drive waveform signals are generated, and is moved forward in accordance with the table number in a reverse direction at a time of reverse rotation so that drive waveform signals are generated. Furthermore, in the case of outputs of the A phase and the B phase, a waveform in which the B phase is ahead of the A phase by 90° is output such that the A phase is a sin (sine) wave and the B phase is a cos (cosine) wave at the time of forward rotation. Thus, a waveform in which the B phase is delayed by 90° from the A phase is output at the time of reverse rotation.

Figure 4B:
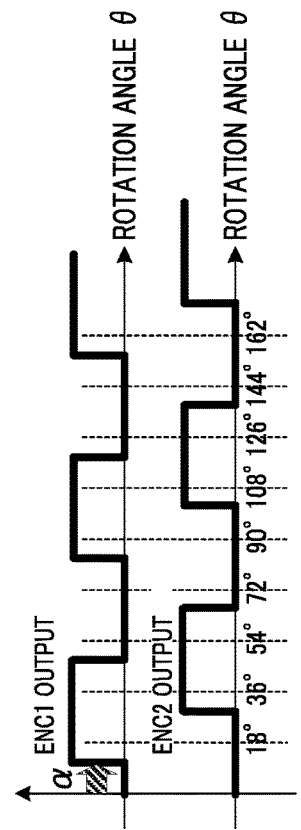
FIGS. 4A to 4C are diagram illustrating relationships between a motor and rotational position detection signals in an embodiment in the present invention.

FIG. 4B illustrates a position relationship between stators and a photo interrupter, and a phase relationship between magnetized phases of the rotor magnet 119 and a reference position of the slit rotating plate 105. A position relationship in which N pole regions of the rotor magnet 119 and bright regions of the slit rotating plate 105 exactly overlap is determined as a reference position relationship. FIG. 4B illustrates a case in which the slit rotating plate is fixed to a position at which the slit rotating plate is shifted from the reference position relationship by α° in the reverse direction. Electrical angles are obtained by redefining phase angles of a sine waveform applied to a rotor and angles at which the rotor magnet 119 is moved forward at that time in units of 360°. A physical angle of 72° in the slit rotating plate 105 and the rotor magnet 119 correspond to an electrical angle of 360°. Since bright and dark phases of the slit rotating plate 105 are generally and randomly provided in the magnetized phases of the rotor magnet 119, a value of α is a random value. However, once the value is provided, the value is not changed.

Figure 4C:
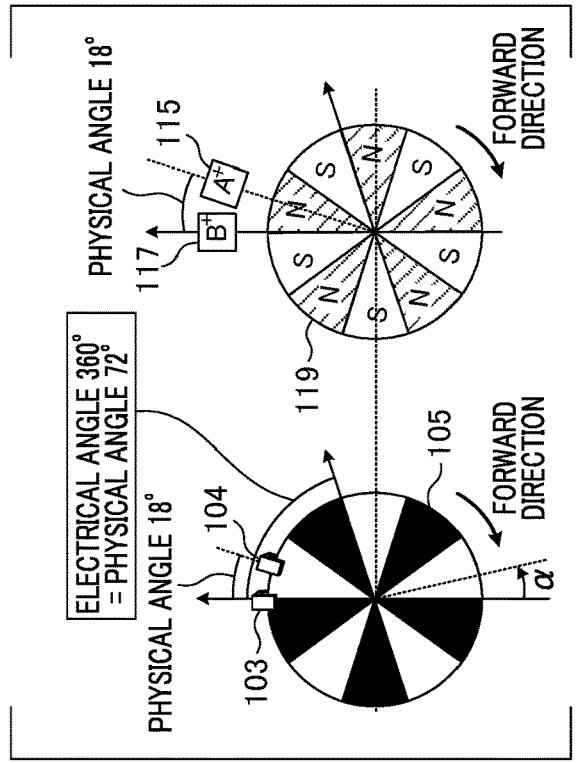
Figure 4A:
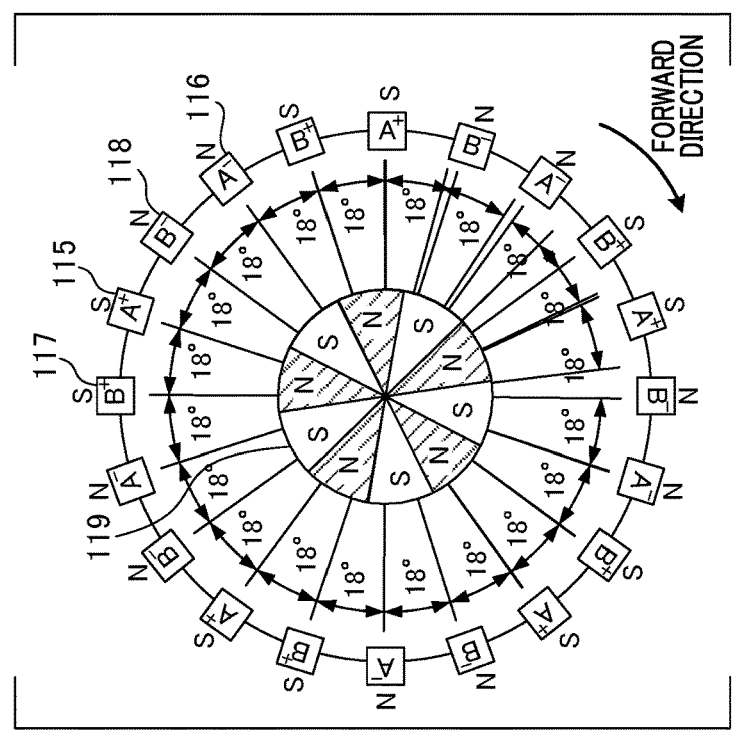

FIG. 4C is a graph in which a change in the ENC1 signal and a change in the ENC2 signal are indicated when a rotational position is rotated from a state in FIG. 4B by θ° in the forward direction. The ENC1 signal is delayed by α° from a rotation start period of time, a change in output is generated, and then outputs of the ENC1 signal and the ENC2 signal are changed every 18° rotation. Here, the value of α is assumed to be specified in advance (since a specific principle of an amount of shift α is described in Japanese Patent Laid-Open No. 2014-45646, the description thereof will be omitted). The value of α is used when positions of the slit rotating plate 105 are detected so that a rotational phase (rotational position states) of the rotor magnet 119 can be specified.

Advanced angle control of the stepping motor 101 will be described with reference to FIGS. 5A to 5D. FIG. 5A illustrates a change in time of the ENC1 signal, and FIG. 5B illustrates a change in time of the ENC2 signal. FIG. 5C illustrates drive voltage waveforms to the A phase coil. It is assumed that N poles are generated in the stators $A^+$ 115 in an upper half (a positive region) of an A phase drive voltage waveform, and N poles are generated in the stators $A^-$ 116 in a lower half (a negative region) of the A phase drive voltage waveform. FIG. 5D illustrates drive voltage waveforms to the B phase coil. It is assumed that N poles are generated in the stators $B^+$ 117 in an upper half (a positive region) in a B phase drive voltage waveform, and N poles are generated in the lower half (the negative region) of the stators $B^-$ 118 of a B phase drive voltage waveform. FIGS. 5C and 5D illustrate amplitude setting values 509 as an amplitude of the A phase drive voltage waveform and an amplitude of the B phase drive voltage waveform.

The encoder circuit 107 in FIG. 2 measures cycle times of periods of time from rising edges to subsequent rising edges and periods of time from falling edges to subsequent falling edges in the ENC1 signal and the ENC2 signal. Hereinafter, such cycle times are handled as information of rotational speeds. In other words, the encoder circuit 107 constitutes a rotational speed detecting means which obtains information of rotational speeds based on a rotational position detection signal. Cycle times 501 to 508 in FIGS. 5A and 5B are as follows.

Cycle times 501 and 503: a length of the period of time from the rising edge to the subsequent rising edge in the ENC1 signal Cycle times 502 and 504: a length of the period of time from the falling edge to the subsequent falling edge in the ENC1 signal Cycle times 505 and 507: a length of the period of time from the rising edge to the subsequent rising edge in the ENC2 signal Cycle times 506 and 508: a length of the period of time from the falling edge to the subsequent falling edge in the ENC2 signal The cycle times 501 to 508 are assumed to be handled as new cycle times until subsequent new cycle times are acquired after the cycle times are acquired. The CPU 108 is subject to interrupt processing at each change timing of the ENC1 signal and the ENC2 signal, and a predetermined process associated with advanced angle control is performed in the process. The CPU 108 acquires latest cycle time information at such timing and a current phase value of a drive waveform in interrupt processing. Furthermore, the CPU 108 determines a timing of an interrupt signal (a type of signal) in risings and fallings of the ENC1 signal and the ENC2 signal and identifies a rotational position of the rotor magnet 119. The CPU 108 changes a period setting value of a sine wave using a current phase value of a drive waveform, the rotational position of the rotor magnet 119, and period information indicating a current speed so that a phase difference between the rotor magnet 119 and the drive waveform converges at a constant value. Since details of a process executed by the CPU 108 in accordance with a predetermined algorithm is the same as a technique disclosed in Japanese Patent Laid-Open No. 2014-45646, the description thereof will be omitted. Hereinafter, a phase difference between a phase of the rotor magnet 119 and a phase of a drive waveform being kept constant is referred to as an advanced angle control process.

When a load is large while a motor control unit (FIG. 2) is performing the advanced angle control process, the motor control unit increases a period of a sine wave to lower a speed of a motor, and thus torque is increased. On the other hand, when the load is small, the motor control unit decreases the period of the sine wave to increase the speed of the motor, and thus the torque is lowered. Thus, the stepping motor 101 has substantially the same motion as a DC motor. During the advanced angle control process, a speed of a motor can be controlled through a change in the amplitude setting values 509 shown in FIGS. 5C and 5D. A specific example of amplitude setting values in drive waveforms will be described with reference to FIGS. 6A to 6C.

Figure 6A:
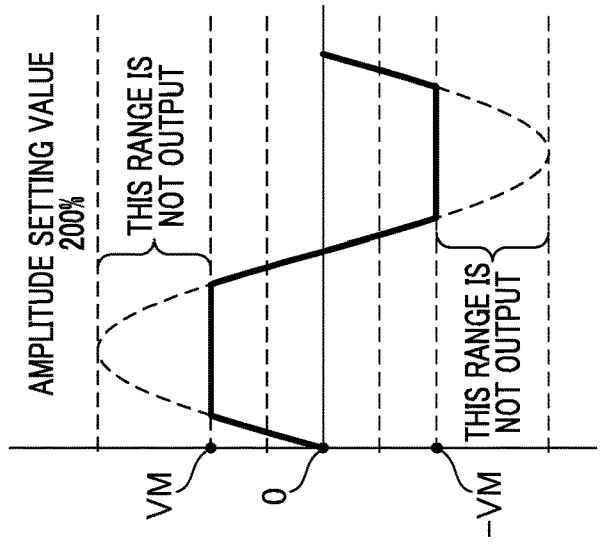
FIGS. 6A to 6C are diagrams illustrating drive waveforms in an embodiment in the present invention.
Figure 6B:
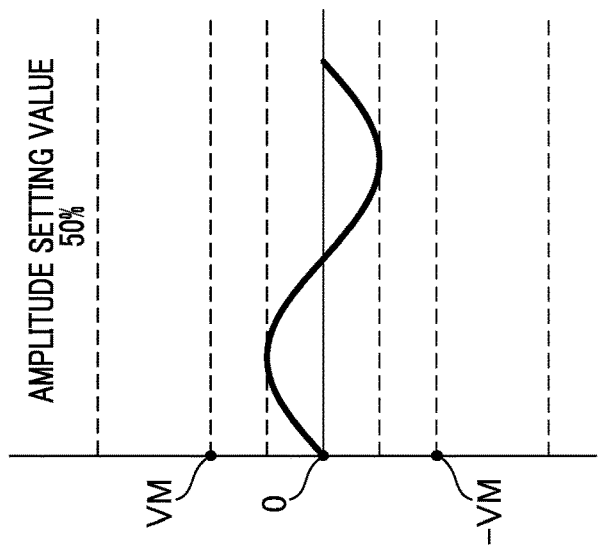
Figure 6C:
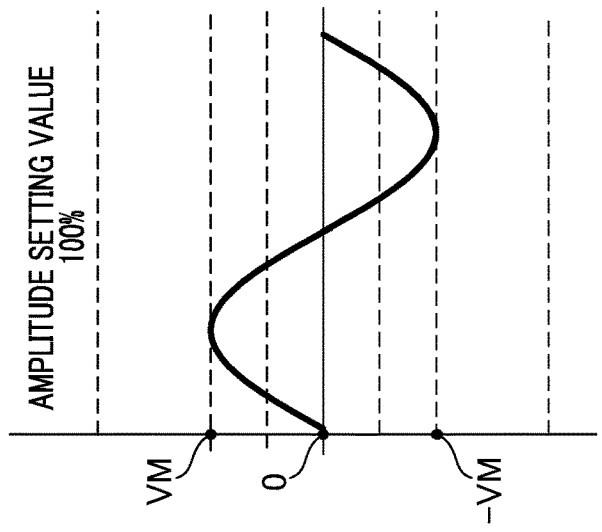

FIGS. 6A to 6C are graphs showing relationships between amplitude setting values represented in units of percentage (%) and electrically conducting voltage waveforms which are actually applied to a coil. "VM" in FIGS. 6A to 6C indicates a maximum voltage which is electrically conductible from the motor control unit to a coil. A horizontal axis is a time axis, and a vertical axis is a voltage axis. FIG. 6A illustrates a case in which an amplitude setting value is set to 100%. An upper limit of a maximum sine wave voltage which can be supplied to the coil is +VM, and a lower limit thereof is −VM. FIG. 6B illustrates a case in which the amplitude setting value is set to 50%. The upper limit of the sine wave voltage is +VM/2, and the lower limit thereof is −VM/2. FIG. 6C illustrates a case in which the amplitude setting value is set to a value greater than 100%, for example, 200%. In this case, a portion in a waveform of a sine wave from which a voltage value greater than or equal to +VM or a voltage value less than equal to −VM is attempted to be output is clamped, and a voltage value of +VM or −VM is output in such a portion. On the other hand, a portion from which a voltage value less than equal to +VM and greater than or equal to −VM is output is correctly output (as a part of a sine wave). In other words, the pseudo trapezoidal waveform is output.

As described above, since a shape of a waveform of a sine wave is deformed so that smoothness of rotation is impaired while the total amount of applied voltages increases when a value greater than 100% is set as the amplitude setting value, there is an advantage in that torque is further increased, and thus a speed of a motor can be increased. An electric motor control method in which efficient speed control is performed using the following regions is provided in Examples.

A region in which a relationship between amplitude setting values less than or equal to 100% and the total amount of output voltages is a linear relationship (hereinafter referred to as a "linear region")

A region in which a relationship between amplitude setting values greater than 100% and the total amount of output voltages is a non-linear relationship (hereinafter referred to as a "non-linear region")

Example 1

Figure 7:
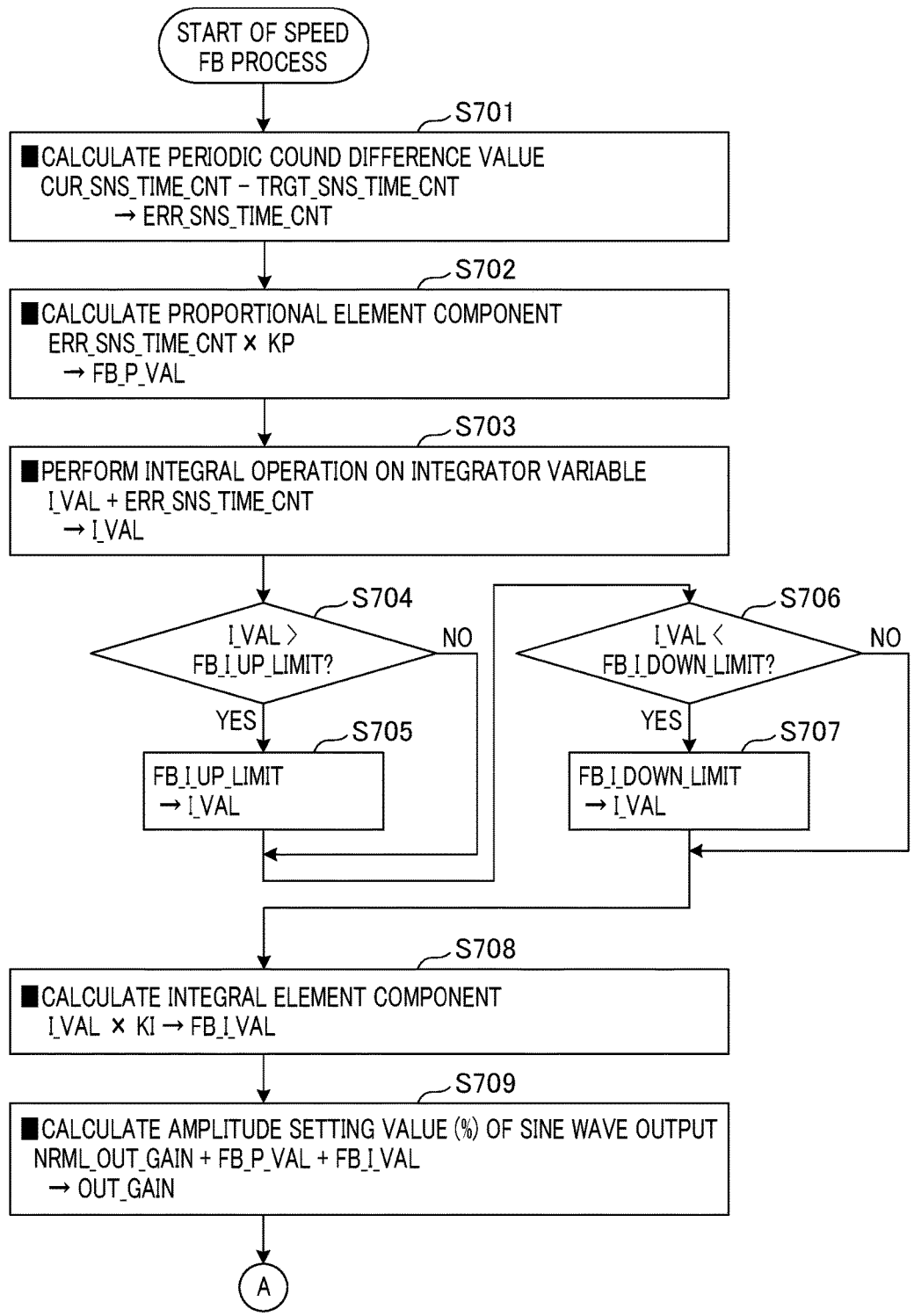
FIG. 7 is a flowchart for describing a processing example of Example 1 in the present invention.

A flow of a process in Example 1 of the present invention will be described with reference to flowcharts in FIGS. 7 and 8. A speed feedback (which is also referred to as an FB) process shown in FIG. 7 is assumed to be performed by the CPU 108 in a periodic process having a necessary and sufficient frequency.

After the speed FB process is started, in S701, the CPU 108 calculates a periodic count difference value. A latest cycle time corresponding to latest speed information which is currently detected is expressed as a variable CUR_SNS_TIME_CNT. A target cycle time of an ENC signal corresponding to a target speed is expressed as a variable TRGT_SNS_TIME_CNT. When a periodic count difference value is expressed as a variable ERR_SNS_TIME_CNT, the periodic count difference value is calculated using the following expression.

ERR_SNS_TIME_CNT=CUR_SNS_TIME_CNT−TRGT_SNS_TIME_CNT

The periodic count difference value is stored in a storage area of the variable ERR_SNS_TIME_CNT. Subsequently, in S702, the CPU 108 calculates a proportional element component in the speed FB process using the following expression. The proportional element component is expressed as a variable FB_P_VAL, and a proportional element constant is expressed as KP.

FB_P_VAL=ERR_SNS_TIME_CNT×KP

The proportional element component FB_P_VAL is calculated by multiplying the periodic count difference value and a proportional element constant, and is stored in a corresponding storage area.

In S703, the CPU 108 performs an integration process of the periodic count difference value ERR_SNS_TIME_CNT on an integrator variable. The integrator variable is expressed as I_VAL. A process in which the periodic count difference value ERR_SNS_TIME_CNT is added to the integrator variable I_VAL and the result of the addition is substituted for the integrator variable I_VAL is performed.

Subsequently, in S704 to S707, a limiter operation of the integrator variable is performed. In S704, a value of the integrator variable I_VAL is compared with an upper limit value. A predetermined integrator upper limit is expressed as FB_I_UP_LIMIT. In the case of "I_VAL>FB_I_UP_LIMIT," that is, when the value is greater than the upper limit value, the process proceeds to a process of S705, and when the value is less than or equal to the upper limit value, the process proceeds to a process of S706.

In S705, after a process in which the integrator upper limit FB_I_UP_LIMIT is substituted for the integrator variable I_VAL and is stored in the storage area is performed, the process proceeds to the process of S706. In S706, the value of the integrator variable I_VAL is compared with a lower limit value. A predetermined integrator lower limit is expressed as FB_I_DOWN_LIMIT. In the case of "I_VAL<FB_I_DOWN_LIMIT," that is, when the value is smaller than the lower limit value, the process proceeds to a process of S707, and when the value is greater than or equal to the lower limit value, the process proceeds to a process of S708. In S707, after a process in which the integrator lower limit FB_I_DOWN_LIMIT is substituted for the integrator variable I_VAL and is stored in the storage area is performed, the process proceeds to the process of S708.

In S708, the CPU 108 calculates a final integral element component (referred to as FB_I_VAL) using the following expression. An integral element constant is expressed as KI.

FB_I_VAL=I_VAL×KI

A value obtained by multiplying the integrator variable I_VAL and the integral element constant KI is calculated and is stored in a storage area of the integral element component FB_I_VAL.

In S709, an amplitude setting value of a sine wave output is calculated. A reference amplitude setting value is expressed as NRML_OUT_GAIN, and a final amplitude setting value is expressed as OUT_GAIN. The sum of three values, i.e., the reference amplitude setting value NRML_OUT_GAIN, the proportional element component FB_P_VAL, and the integral element component FB_I_VAL, is calculated. The result of the addition is stored in a storage area of the final amplitude setting value OUT_GAIN.

Figure 8:
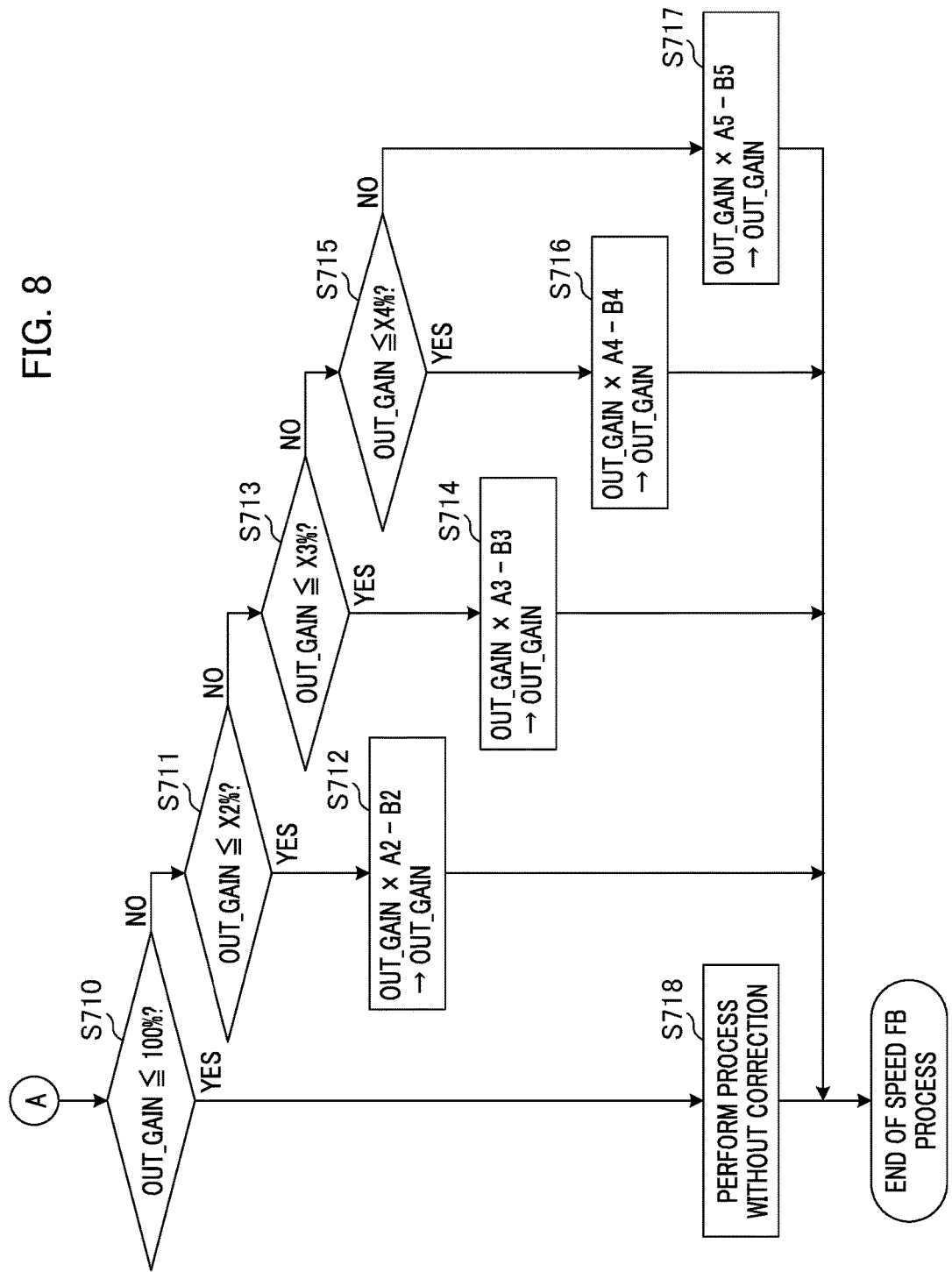
FIG. 8 is a flowchart for describing a process following the process of FIG. 7.

In S710 in FIG. 8, a value of the final amplitude setting value OUT_GAIN is compared with a predetermined threshold value (%). A determination process concerning whether the predetermined threshold value is 100% and whether the final amplitude setting value is a threshold value or less is performed. When the value of the final amplitude setting value OUT_GAIN is 100% or less, the process proceeds to a process of S718, and the final amplitude setting value OUT_GAIN at that time is adopted and is used in a subsequent output process of the sine wave generator 109. Furthermore, in S710, when the value of the final amplitude setting value OUT_GAIN is greater than 100%, the process proceeds to a process of S711. Processes of S711 to S717 will be described using FIGS. 9 to 11.

Figure 9:
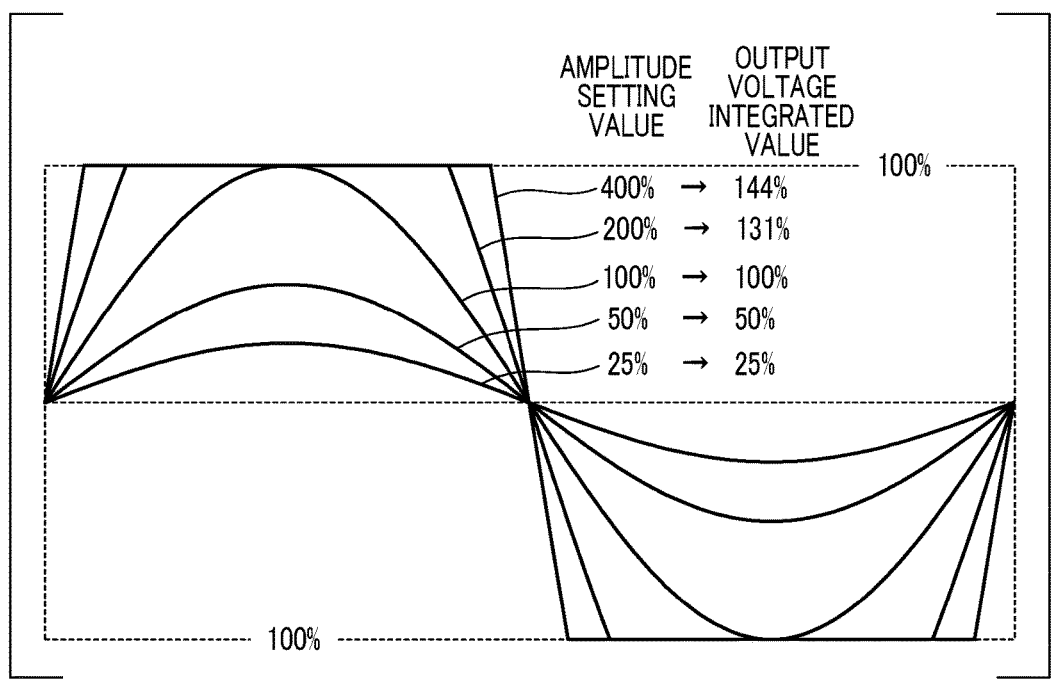
FIG. 9 is a diagram illustrating drive waveforms of Example 1.

FIG. 9 is a diagram illustrating a relationship between amplitude setting values and integrated values of an output voltage as an example. A horizontal axis is a time axis, and a vertical axis indicates outputs of the sine wave generator 109. When the amplitude setting value is 100% or less, an output waveform of the sine wave generator 109 is a sine wave. When the amplitude setting value is greater than 100%, the output waveform of the sine wave generator 109 is not a sine wave (a pseudo-trapezoidal wave). FIG. 9 illustrates a case in which, when a maximum amplitude setting value from which a sine wave output is obtained is set to 100%, amplitude setting values obtained by performing normalization using an area (an integrated value) of a half cycle of the waveform set to 100% are set to 25, 50, 100, 200, and 400%. Output voltage integrated values corresponding to the amplitude setting values of 25, 50, 100, 200, and 400% are 25, 50, 100, 131, and 144%. In other words, the amplitude setting values and the output voltage integrated values have a linear relationship in a range in which the amplitude setting values are 100% or less. The output voltage integrated values corresponding to the amplitude setting values of 200% and 400% are only 131% and 144% in a range in which the amplitude setting values are greater than 100%. In other words, the amplitude setting values and the output voltage integrated values have a non-linear relationship. The sine wave generator 109 generates a drive waveform of a sine wave or a pseudo-trapezoidal wave depending on a frequency and an amplitude set by the CPU 108.

FIGS. 10A to 10G are diagrams illustrating relationships between amplitude setting values and output voltage integrated values shown in FIG. 9. FIGS. 10A to 10E are schematized diagrams of five states with different amplitude setting values shown in FIG. 9. The states are expressed as S1 to S5. The state S1 corresponds to a state with the amplitude setting value of 25%, and the state S5 corresponds to a state with the amplitude setting value of 400%.

Figure 10F:
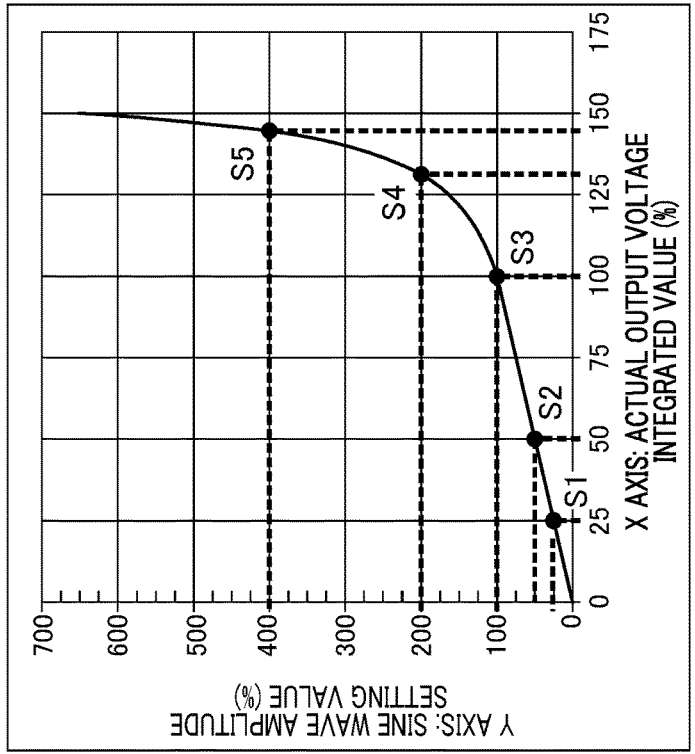

FIG. 10F is a graphed diagram in which an X axis is set to an amplitude setting value (%) and a Y axis is set to an actual output voltage integrated value (%). A range in which the amplitude setting value shown on the X axis is less than or equal to 100% is a linear range, and a graph line thereof is a straight line. A range in which the amplitude setting value is greater than 100% is a non-linear range, and a graph line thereof is a curve. It can be seen from the graph lines that, for example, when a voltage of 200% is set (the state S4), an output of only 131% is actually performed.

Figure 10G:
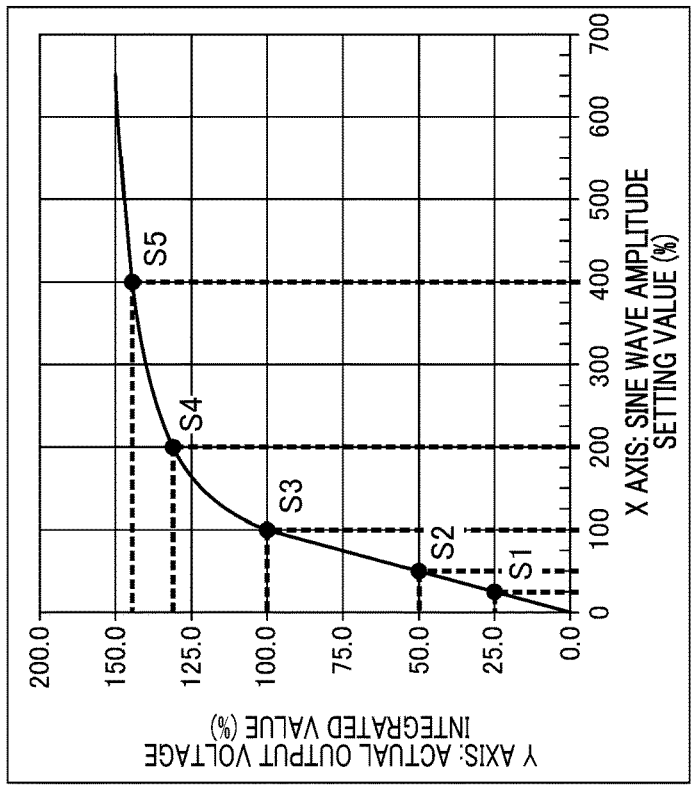

FIG. 10G is a diagram illustrating characteristics used to perform correction in this example as an example. An X axis indicates an actual output voltage integrated value (%), and a Y axis indicates an amplitude setting value (%). In other words, FIG. 10G uses a graph to illustrate characteristics when the X axis and the Y axis of FIG. 10F are reversed. When an amplitude setting value on the X axis of this graph corresponding to a voltage output is appropriately applied, an amplitude setting value to actually be set at a corresponding Y axis is obtained. For example, a case in which it is desired that output of 131% serve as an output of 100% or more is assumed. In this case, an actually set amplitude setting value is determined to be 200% depending on a graph line of FIG. 10G. In other words, the state S4 shown in FIG. 10D is obtained. A final output voltage integrated value is 131%, and correction is performed so that a desired output and an actual output are the same. As described above, correction characteristics shown in FIG. 10G have a relationship of an inverse function with respect to characteristics in FIG. 10F. Therefore, speed control can be performed while a linear relationship is maintained even when an output function of a pseudo-trapezoidal wave is used.

A process of S710 to S717 in FIG. 8 is performed depending on the correction characteristics shown in FIG. 10G. Here, since correction using a curve has a large processing load in a digital process inside an actual CPU, the process is performed in accordance with a polygonal line generated using straight line approximation. A description thereof will be provided using a specific example illustrated in FIG. 11.

Figure 11:
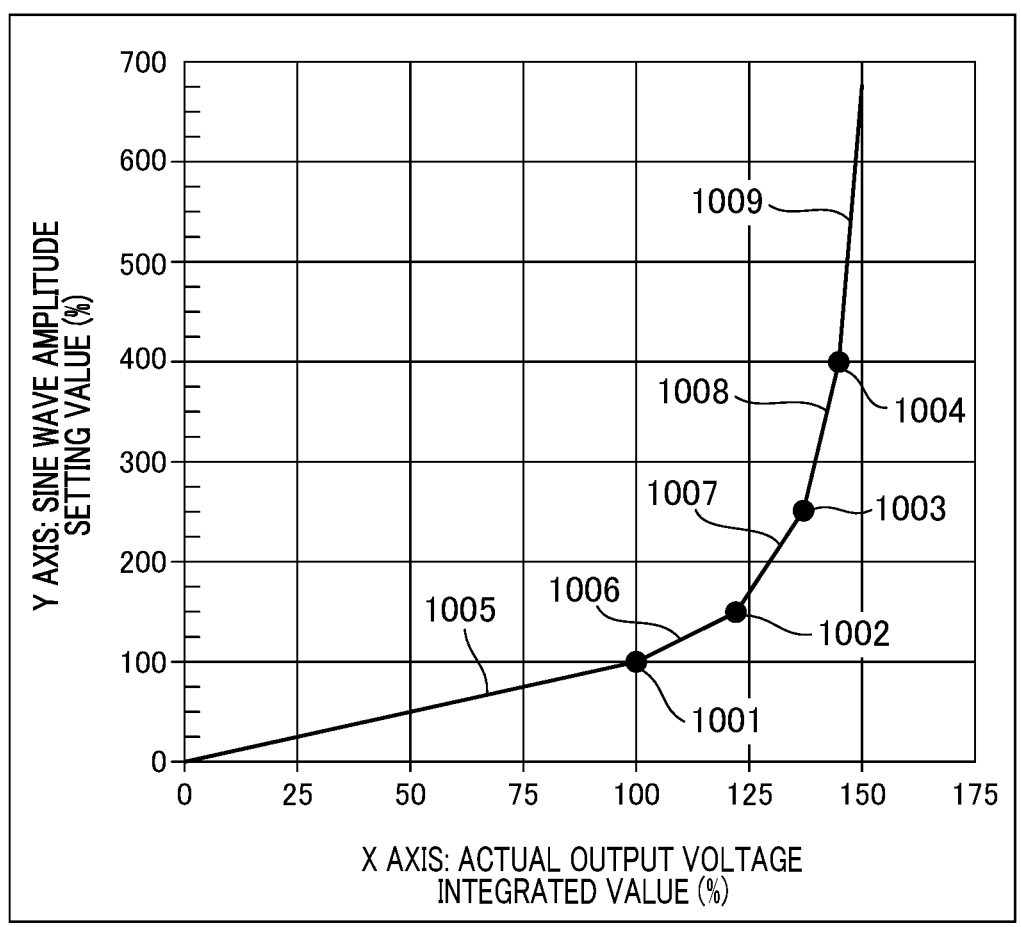
FIG. 11 is a diagram illustrating a method of correcting a relationship between the amplitude setting values and the outputs of Example 1.

FIG. 11 illustrates an example of correction characteristics when the graph curve in FIG. 10G is approximated using a combination of line segments 1005 to 1009. Coordinates (X, Y) of links of the five line segments 1005 to 1009 in FIG. 11 are as follows.
Connection point 1001 (100,100)
Connection point 1002 (X2,150)
Connection point 1003 (X3,250)
Connection point 1004 (X4,400)

In FIG. 11, settings of an X axis and a Y axis are the same as those in FIG. 10G. The line segments 1005 to 1009 are expressed by the following expression.
Line segment 1005 (0%≤X≤100%)

$$Y=X \quad (1)$$

Line segment 1006 (100%<X≤X2%)

$$Y=A2 \times X - B2 \quad (2)$$

Line segment 1007 (X2%<X≤X3%)

$$Y=A3 \times X - B3 \quad (3)$$

Line segment 1008 (X3%<X≤X4%)

$$Y=A4 \times X - B4 \quad (4)$$

Line segment 1009 (X>X4%)

$$Y=A5 \times X - B5 \quad (5)$$

Coefficient values (slopes A2 to A5 and intercepts B2 to B5) in Expressions (2) to (5) and data concerning coordinate values of connection points are held in a memory as correcting data indicating amplitude characteristics of a drive waveform corresponding to an output of a motor. Alternatively, a correcting data table corresponding to FIG. 11 is stored in the memory.

In this example, a correcting process is performed using correction characteristics shown in an approximate straight line group in FIG. 11. In other words, processes of S710 to S718 in FIG. 8 are as follows.
(1) In the case of 0%≤X≤100% (Yes in S710)
    In S718, OUT_GAIN is a final amplitude setting value as it is in accordance with Expression (1) associated with the line segment 1005.
(2) In the case of 100%<X≤X2% (Yes in S711)
    X2% in S711 is an X coordinate value of a link of the line segment 1006 and the line segment 1007 in FIG. 11. In S712, when a determination condition in S711 is satisfied, the amplitude setting value OUT_GAIN is corrected on the basis of Expression (2) associated with the line segment 1006 in FIG. 11. When the determination condition in S711 is not satisfied, the process proceeds to a process of S713.
(3) In the case of X2%<X≤X3% (Yes in S713)
    X3% in S713 is an X coordinate value of a link of the line segment 1007 and the line segment 1008 in FIG. 11. In S714, when a determination condition in S713 is satisfied, the amplitude setting value OUT_GAIN is corrected on the basis of Expression (3) associated with the line segment 1007 in FIG. 11. When the determination condition of S713 is not satisfied, the process proceeds to a process of S715.
(4) In the case of X3%<X≤X4% (Yes in S715)
    X4% in S715 is an X coordinate value of a link of the line segment 1008 and the line segment 1009 in FIG. 11. In S716, when a determination condition in S715 is satisfied, the amplitude setting value OUT_GAIN is corrected on the basis of the line segment 1008 in FIG. 11. When the determination condition in S715 is not satisfied, the process proceeds to a process of S717.
(5) In the case of X>X4% (No in S715)
    In S717, the amplitude setting value OUT_GAIN is corrected on the basis of Expression (5) in the line segment 1009 in FIG. 11.

Final amplitude setting values determined in S712, S714, S716, S717, and S718 are adopted in the sine wave generator 109, and speed FB control is performed.

In this example, when a final amplitude setting value and actual work given to a motor have a non-linear relationship in speed FB control performed on the motor, a correcting process of minimizing non-linearity thereof is performed by performing a correction in the non-linear region. Thus, an oscillation operation of an object to be controlled can be minimized or a delay in a convergence time of the object to be controlled can be improved.

Example 2

Next, Example 2 of the present invention will be described with reference to FIGS. 12A to 18. In Example 1, with regard to a voltage waveform, a process of correcting non-linearity between an amplitude setting value and an output value (an integrated value) is illustrated. In this example, a process of correcting non-linearity of output torque using an amplitude setting value and a relationship between a rotational phase of the rotor magnet 119 and a phase of a drive waveform is illustrated. For this reason, first, a principle explanation of changed content of the output torque due to a phase difference between the rotational phase of the rotor magnet 119 and the phase of the drive waveform will be provided using FIGS. 12A to 17A and 17B.

FIGS. 12A to 12E are diagrams for describing a mechanism of rotational torque generated due to excitation of the stators $A^+$ 115. FIGS. 12A to 12D illustrate cases in which rotational phases of a rotor are 0°, 90°, 180°, and 270°. FIGS. 12A to 12D illustrate simplified structures having a rotor magnet in which the number of pole pairs is 1 and a pair of stator coils for clarity of explanation. In other words, a structure of the motor shown in FIG. 4A will be described as a structure having a rotor magnet, which has one S pole and one N pole, and stator coils, which have an A phase and a B phase. The stators $A^+$ 115 and the stators $B^+$ 117 are disposed around the rotor magnet 119, and the rotor magnet 119 is rotated 90° as it is moved in states shown in FIGS. 12A, 12B, 12C, and 12D. FIG. 12E illustrates a magnetic force and torque conversion curve at a time of forward rotation, and a horizontal axis indicates a rotational phase θ of the rotor magnet 119. It is assumed that the stators $A^+$ 115 are subject to N pole excitation and the stators $B^+$ 117 have a non-excited state. Since the rotor magnet 119 receives only a repulsive force 1101 from the stators $A^+$ 115 in a direction which is perpendicular to a direction of rotation thereof and rotational torque thereof is 0 in the state of FIG. 12A in this situation. Point 1107 on the magnetic force and torque conversion curve in FIG. 12E indicates the rotational torque in the state in FIG. 12A.

In a state in FIG. 12B, the stators $A^+$ 115 have an attractive force 1102 acting on the S pole of the rotor magnet 119 to attract the S pole and have a repulsive force 1103 acting against the N pole. Since maximum torque is generated in a positive direction in the forward direction in this state, a magnitude of the rotational torque is maximized in the positive direction as indicated by point 1108 on the magnetic force and torque conversion curve in FIG. 12E.

In a state in FIG. 12C, the stators $A^+$ 115 have only an attractive force 1104 acting on the S pole of the rotor magnet 119 in the direction which is perpendicular to a direction of rotation to attract the S pole, and rotational torque thereof is 0. Point 1109 on the magnetic force and torque conversion curve in FIG. 12E indicates the rotational torque in the state in FIG. 12C.

In a state in FIG. 12D, the stators $A^+$ 115 have an attractive force 1106 acting on the S pole of the rotor magnet 119 to attract the S pole and have a repulsive force 1105 acting against the N pole. Since maximum torque is generated in a negative direction in the forward direction in this state, a magnitude of rotational torque is maximized in the negative direction as indicated by point 1110 on the magnetic force and torque conversion curve in FIG. 12E.

In FIG. 12E, even when the stators $A^+$ 115 are N-pole-excited with the same amount of excitation, almost no rotational torque is generated about rotational phases of 0° and 180°. Furthermore, rotational torque in a direction opposite to that in a region of a rotational phase of 0° to 180° acts in a region of a rotational phase of 180° to 360°. However, if switching is performed so that the stators $A^+$ 115 are S-pole-excited in the region of the rotational phase of 180° to 360°, control can be performed such that rotational torque is generated in the same direction over an entire region of the rotational phase of 0° to 360°.

FIGS. 13A to 13E are diagrams illustrating results of the same consideration as in the case of FIG. 12A to 12E focusing on the $B^+$ stator 116. When a position of the $B^+$ stator 116 is used as a reference, FIG. 13A illustrates an attractive force 1111 with respect to an S pole and a repulsive force 1112 with respect to an N pole. FIG. 13B illustrates an attractive force 1113 with respect to the S pole, and FIG. 13C illustrates an attractive force 1114 with respect to the S pole and a repulsive force 1115 with respect to the N pole. FIG. 13D illustrates a repulsive force 1116 with respect to the N pole. FIG. 13E illustrates a magnetic force and torque conversion curve with respect to a B phase and has a curve of a phase shifted by 90° from that of the magnetic force and torque conversion curve shown in FIG. 12E. In other words, magnitudes of rotational torques at point 1117 (θ=0°) and point 1119 (θ=180°) on the magnetic force and torque conversion curve shown in FIG. 13E are maximized in a positive direction and a negative direction, respectively. Rotational torques at point 1118 (θ=90°) and point 1120 (θ=270°) are 0.

Figure 14A:
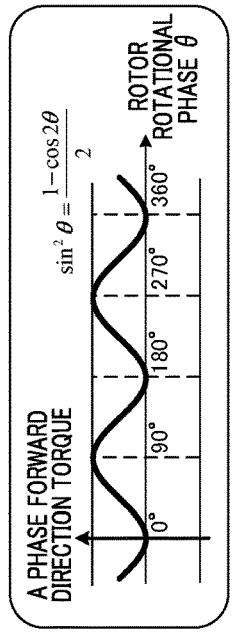
FIGS. 14A to 14G are diagram illustrating behaviors of an electric motor when the electric motor rotates with maximum efficiency in sine drive waves.
Figure 14B:
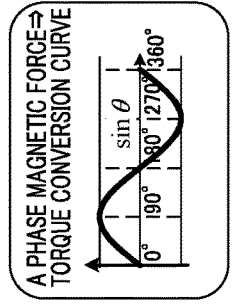
Figure 14C:
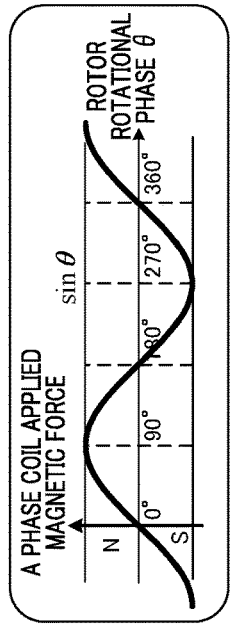
Figure 14D:
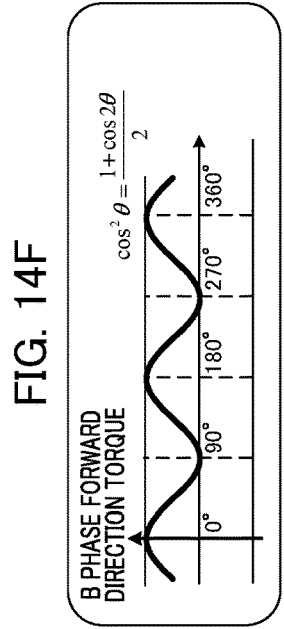

FIGS. 14A to 14G are diagrams for describing rotational torque generated by an entire motor when a sine wave drive waveform is applied with a phase difference which generates maximum torque with respect to a rotational phase of the rotor magnet 119 based on FIGS. 12A to 12E and FIGS. 13A to 13E. FIG. 14A is a graph for describing an excitation magnetic force to an A phase coil, which is expressed by a sine function sin θ at a rotational phase θ of the rotor magnet 119. FIG. 14D is a graph for describing an excitation magnetic force to a B phase coil, which is expressed by a cosine function cos θ at a rotational phase θ of the rotor magnet 119. A positive region corresponds to an N pole excitation, and a negative region corresponds to an S pole excitation. Since a magnetic force generated at a coil is proportional to a current value flowing through the coil, when inductance of the coil is sufficiently small, a magnetic force can be regarded as being generated in proportion to a voltage waveform applied to the coil. In this example, it is assumed that the inductance of the coil is sufficiently small.

Figure 14E:
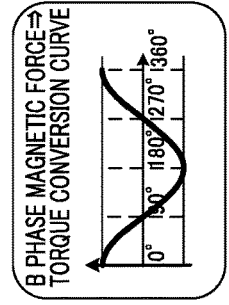
Figure 14F:
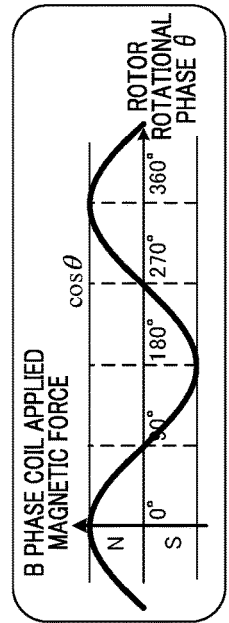
Figure 14G:
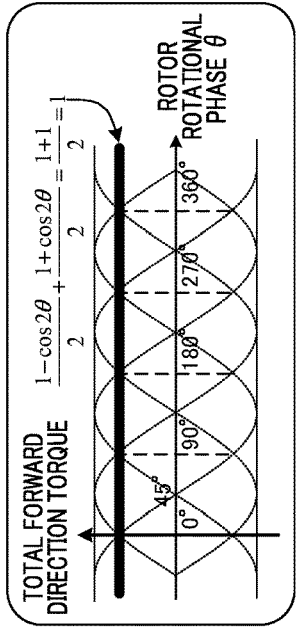

FIG. 14B and FIG. 14E correspond to FIG. 12E and FIG. 13E, respectively. FIG. 14C illustrates a graph of a function obtained by multiplying a function of the graph in FIG. 14A by a function of the graph in FIG. 14B. The graph in FIG. 14C illustrates torque of a motor generated by an A phase in a forward direction thereof and is represented by the square of sin θ. Furthermore, FIG. 14F illustrates a graph of a function obtained by multiplying a function of the graph in FIG. 14D by a function of the graph in FIG. 14E. FIG. 14F illustrates torque of the motor generated by a B phase in the forward direction thereof and is generated by the square of cos θ. FIG. 14G illustrates a graph of a function by adding the graphs in FIGS. 14C and 14F. FIG. 14G illustrates torque generated by the entire motor, and a constant straight line, which is indicated by a thick line in FIG. 14G, represents total torque.

Maximum torque is generated when phases of applied drive voltage waveforms illustrated in FIGS. 14A and 14D are the same as phases in the magnetic force and torque conversion curve illustrated in FIGS. 14B and 14E. In this specification, such a state is defined as a state with an advance angle of 0°. It is assumed that a drive waveform is a pseudo-trapezoidal wave like in Example 1 while a state with the advance angle of 0° is maintained. In this case, if it is assumed that an amplitude setting value of the sine wave generator 109 is increased to a limit thereof, the pseudo-trapezoidal wave is a rectangular wave. FIGS. 15A to 15G illustrate extreme cases. Since FIGS. 15A to 15G correspond to FIGS. 14A to 14G, differences thereof will be described.

Figure 15A:
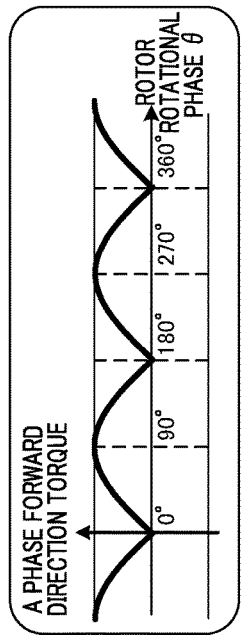
FIGS. 15A to 15G are diagrams illustrating behaviors of an electric motor when the electric motor rotates with maximum efficiency in rectangular drive waves.
Figure 15B:
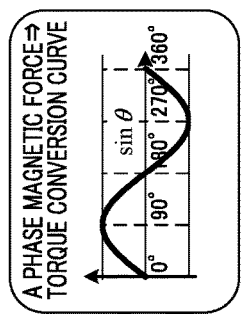
Figure 15C:
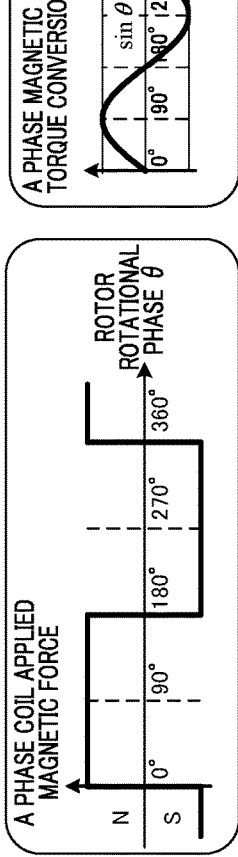
Figure 15D:
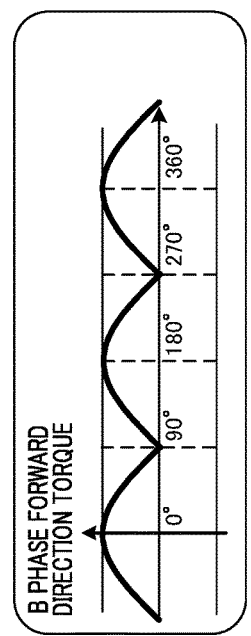
Figure 15E:
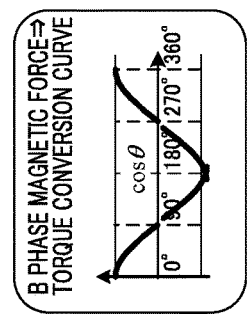
Figure 15F:
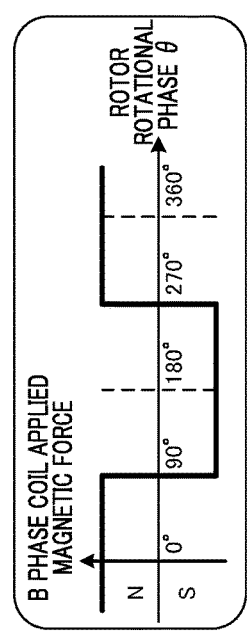
Figure 15G:
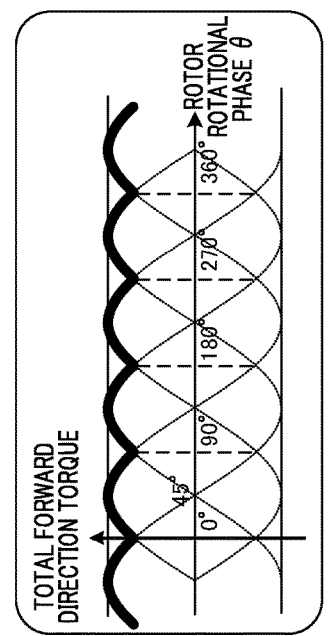

Total torque shown in FIG. 15G is finally acquired through a process as described in FIGS. 14A to 14G when rectangular wave voltages shown in FIGS. 15A and 15D are applied to A phase and B phase coils while a phase relationship of the advance angle of 0° is maintained. A curve of the total torque shown in FIG. 15G is not a constant straight line but a waveform with a ripple above total torque of FIG. 14G. In other words, when the pseudo-trapezoidal wave is asymptotically changed to a rectangular wave by increasing a slope (a diagonal section) of a pseudo-trapezoidal wave, the wave finally converges at a curve of the total torque shown in FIG. 15G.

Figure 17A:
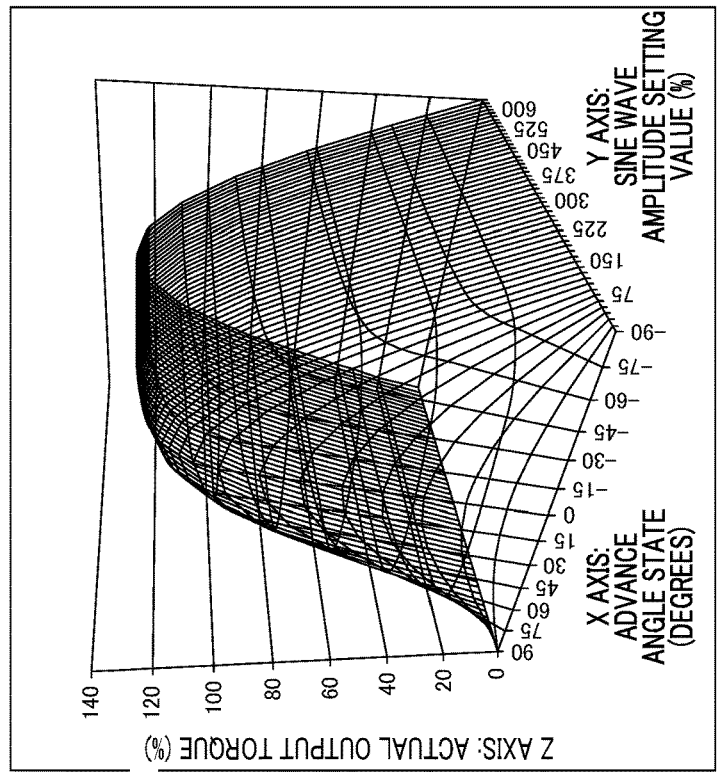
FIGS. 17A and 17B are relationship diagrams for describing a correction of Example 2 of the present invention.

FIG. 17A is a diagram in which an X axis indicates an amplitude setting value (%), a Y axis indicates an actual output torque (%), and characteristics when an advance angle is changed by 15° from 0° within a range of ±90° are illustrated using a graph. For example, in a graph curve illustrated using the advance angle of 0 degrees, a linear region from an origin to the point 1001 indicates a straight line section when an amplitude setting value of the sine wave generator 109 is increased from 0% to 100% in a state of the advance angle of 0 degrees. When the amplitude setting value of the sine wave generator 109 is further increased to 100% or more, the final output torque changes in the non-linear region. Note that FIG. 17A illustrates a graph obtained in a case in which the point 1001 is set as a reference point, actual output torque when the amplitude setting value is 100% is set as 100%, and normalization is performed.

Figure 16A:
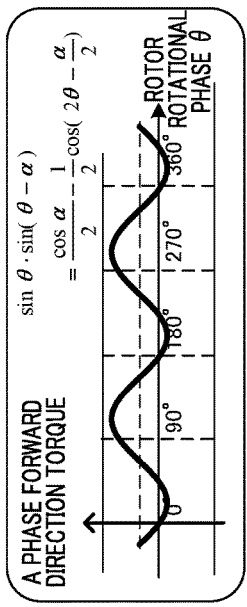
FIGS. 16A to 16G are diagrams illustrating behaviors of a motor when the motor rotates in a state in which it has an efficiency shifted from maximum efficiency in sine drive waves.
Figure 16B:
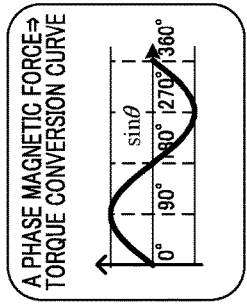
Figure 16C:
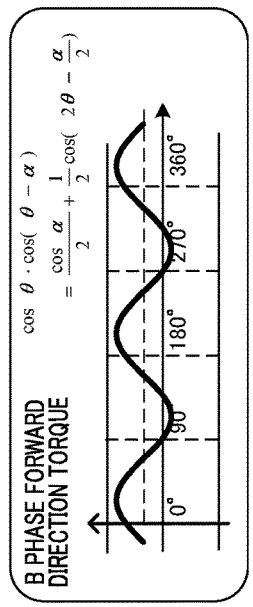

FIGS. 16A to 16G are diagrams for describing torque generated by a motor when an advance angle is changed from a state of an advance angle of 0 degrees to −α degrees. Since FIGS. 16A to 16G correspond to FIGS. 14A to 14G, differences thereof will be described. Graphs shown in FIGS. 16A and 16D have a relationship in which a phase in the rotor magnet 119 of a drive waveform with respect to a rotational phase is delayed by α degrees compared with the corresponding graphs shown in FIGS. 14A and 14D. Such a state is a state in which the advance angle is −α degrees. In this case, if the motor undergoes the same process as FIGS. 14A to 14G and FIGS. 15A to 15G, the torque of the entire motor is expressed as a constant straight line, which is a thick line shown in FIG. 16G. When the torque is specifically calculated, the torque of the entire motor generated using a sine drive waveform in which the advance angle is −α degrees is expressed as cos α, that is, a cosine function of α, when the total torque in the case of FIG. 14G is set to 1. A magnetic force of an A phase coil in FIG. 16A is represented by sin (θ−α), and a magnetic force and torque conversion curve in FIG. 16B is represented by sin θ. A graph in FIG. 16C is represented by sin (θ−α)×sin θ.

Figure 16D:
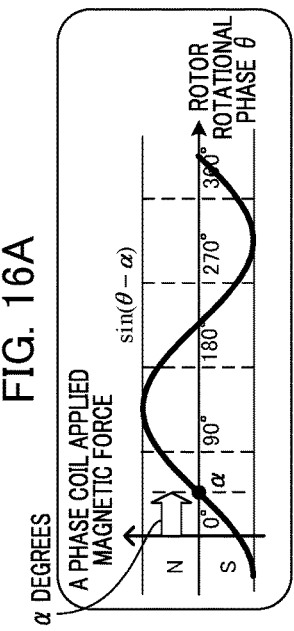
Figure 16E:
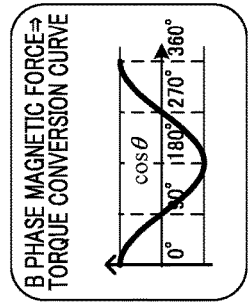
Figure 16F:
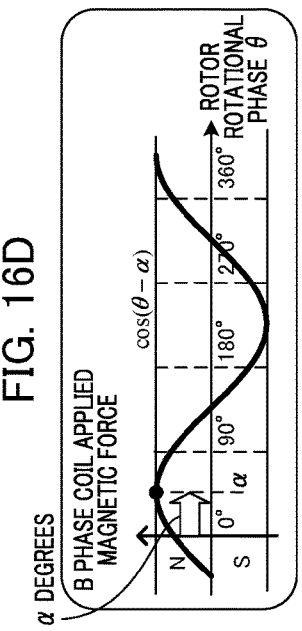
Figure 16G:
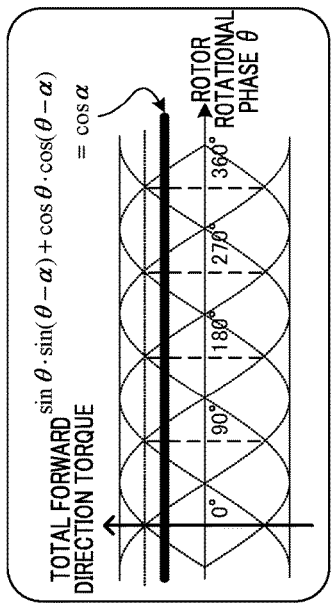
Figure 17B:
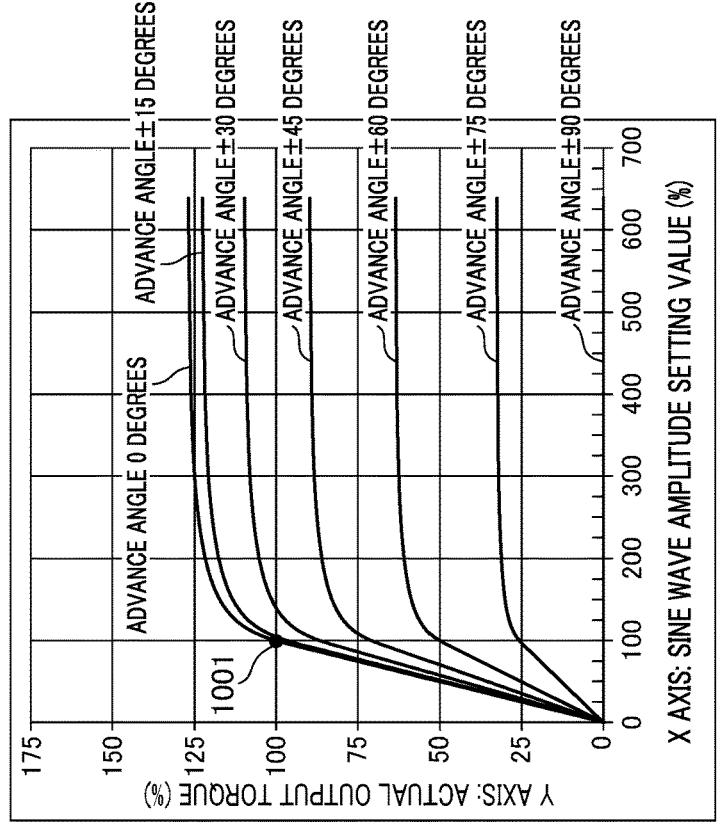

Furthermore, a magnetic force of a B phase coil in FIG. 16D is represented by cos (θ−α), and a magnetic force and torque conversion curve in FIG. 16E is represented by cos θ. A graph in FIG. 16F is represented by cos (θ−α)×cos θ. The total torque in FIG. 16G is represented by sin (θ−α)×sin θ+cos (θ−α)×cos θ=cos α. Although description will not be provided using the drawings, even in the case of driving using a pseudo-trapezoidal wave or a rectangular wave, when the advance angle is −α degrees, the total torque is uniformly lowered to a value obtained by multiplying a function of the curve and cos α. Therefore, when normalization is performed using torque and the amplitude setting value is set to 100% in a state in which the advance angle of 0 degrees is 100%, as shown in FIG. 17A, a graph is obtained by multiplying a function of the curve and a coefficient of cos α in accordance with the advanced angle value. In other words, a relationship curve between an amplitude setting value and output torque in a state in which the advance angle is changed from 0 degrees is a curve of a function obtained by multiplying a function of a curve when the advance angle is 0 degrees and the cos α. FIG. 17A illustrates curves of ±15 degrees, ±30 degrees, ±45 degrees, ±60 degrees, ±75 degrees, and ±90 degrees used as typical examples of advance angle values. FIG. 17B is a three-dimensionally-graphed diagram of FIG. 17A, in which an X axis indicates an advance angle (degrees), a Y axis indicates an amplitude setting value (%) in a sine wave, and a Z axis indicates actual output torque (%).

Figure 18:
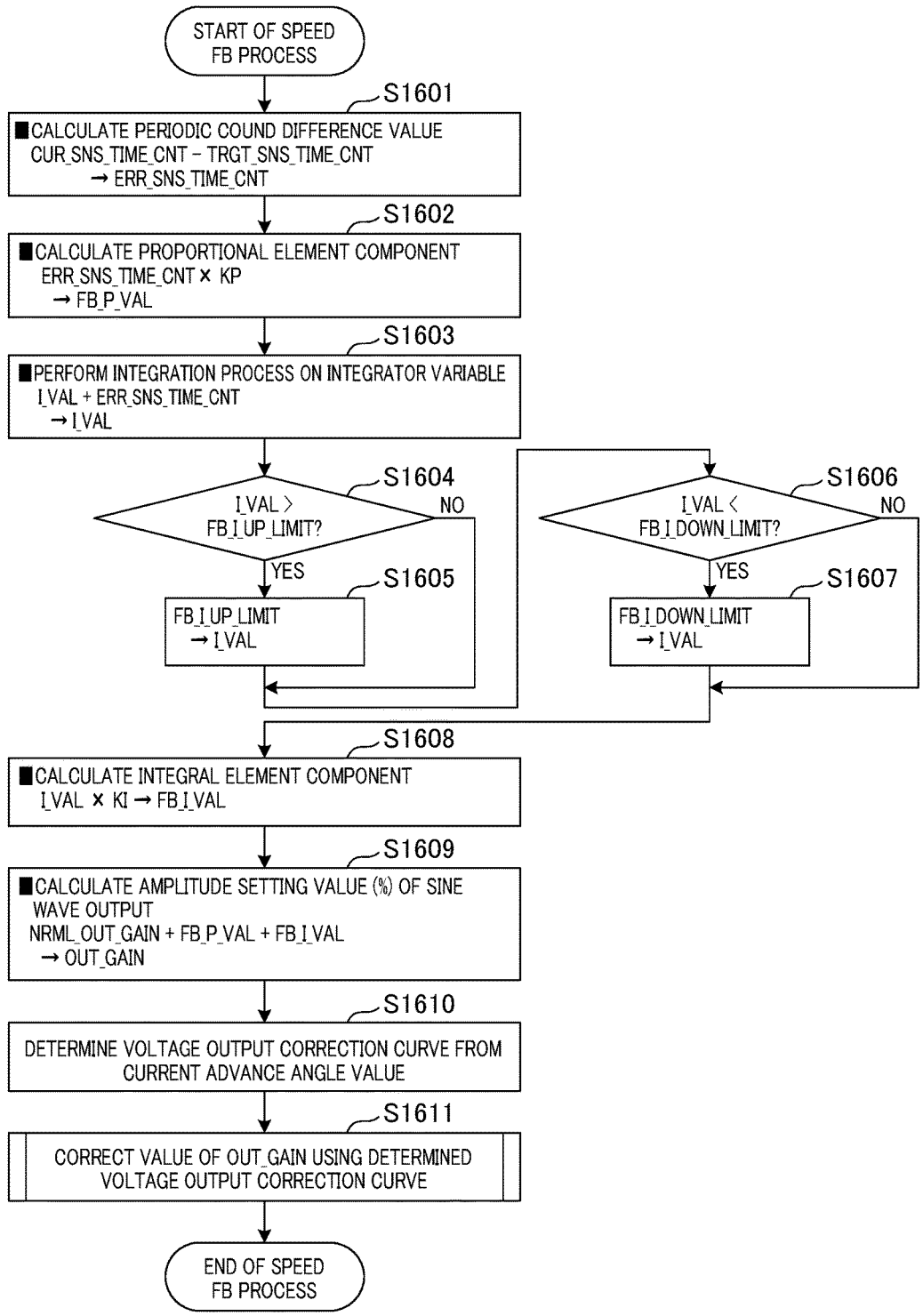
FIG. 18 is a flowchart for describing a processing example of Example 2.

In this example, a phase delay between a drive voltage waveform and a current waveform in a drive coil is identified, and an amplitude setting value is determined such that the phase delay is corrected. A relationship between an amplitude setting value finally set through speed FB control and generated torque in a motor is involved in a correcting process based on non-linearity of an amplitude setting value and generated torque and factors of torque reduction due to an advance angle state. Therefore, a correcting process associated with higher linearity control can be realized. The speed FB control in this example will be described with reference to the flowchart in FIG. 18. Since processes of S1601 to S1609 in FIG. 18 are the same as the processes of S701 to S709 described in FIG. 7 in Example 1, detailed descriptions thereof will be omitted and differences thereof will be described.

In S1610, the CPU 108 identifies a current advance angle value on the basis of rotational phases (rotational position states) of the rotor magnet 119 corresponding to the ENC1 signal and the ENC2 signal and a current phase in a drive waveform. An advance angle value at that time is set to a degrees. A curve obtained by multiplying and compressing a reference curve with an advance angle of 0 degrees shown in FIG. 17A and cos (−α) in a vertical direction is generated. A curve obtained by exchanging the X axis with the Y axis at the generated curve is generated. This is identical to a process of calculating the correction characteristics in FIGS. 10F to 10G in Example 1. The CPU 108 determines a voltage output correction curve using the generated curve based on the advance angle value. In an actual process, it is assumed that the curve with the advance angle of 0 degrees shown in FIG. 17A is held in a storage unit in advance as data which is based on a correction characteristic expression in which a plurality of line segments are joined using straight line approximation as described in FIG. 11.

Subsequently, in S1611, the CPU 108 corrects a value of the final amplitude setting value OUT_GAIN using the voltage output correction curve determined in S1610. Since a specific correcting process is the same as in S711 to S717 in FIG. 8 described in Example 1, a detailed description thereof will be omitted.

A process in this example is performed so that a speed control process with higher linearity than the process in Example 1 is realized in a relationship between the amplitude setting value and the final output torque of the sine wave generator 109. In other words, a more detailed correction process can be performed in consideration of an influence on torque due to a magnetized phase of the rotor and an influence on a change in torque due to a change in advance angle state. Since inductance in a coil is sufficiently small and a voltage and current applied to the coil have the same phase, an applied voltage phase and an excitation phase are treated as being the same in this example. When the inductance is large and a current delay cannot be ignored, a correcting process in which the amount of delay is assumed is performed.

Modified Example

In Examples 1 and 2, the description thereof has been given using a configuration in which a drive waveform of a pseudo-trapezoidal wave may be used at all times when a speed is controlled. In a modified example, speed characteristics of an electric motor are individually acquired in advance and ON/OFF of speed control using a pseudo-trapezoidal wave is switched in accordance with a target rotation speed. Since careless use of a pseudo-trapezoidal wave is likely to affect vibrations and noise, as long as the motor can sufficiently reach a target rotation speed with a sine waveform-like drive waveform, the target rotation speed may be set in advance such that the process does not proceed to the process of S711 to S717 in FIG. 8.

In the modified example, the CPU 108 stores individual difference information of speed characteristics of the motor in a storage unit. It is assumed that the individual difference information is information representing a characteristic difference of speed characteristics of each motor and is specified in advance through measurement or the like. The CPU 108 determines whether a target speed can be accomplished using a drive waveform of a sine wave through speed control of the motor on the basis of the individual difference information acquired from the storage unit and the target speed of the control. The CPU 108 sets an amplitude of the sine wave generator 109 in a linear region when it is determined that the target speed can be accomplish using the drive waveform of the sine wave.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-173847, filed Sep. 6, 2016, which is hereby incorporated by reference wherein in its entirety.

What is claimed is:

1. An electric motor control device comprising:
at least one processor or circuit programmed to function as:
a generating unit configured to generate a drive waveform to an electric motor;
a position detecting unit configured to detect a rotational phase of the electric motor and to output a detected signal;
a speed detecting unit configured to detect information of a rotational speed of the electric motor based on the detected signal output by the position detecting unit; and
a control unit configured to control a phase relationship between the rotational phase of the electric motor and a phase of the drive waveform and set an amplitude of the drive waveform corresponding to a difference between a target speed and the information of rotational speed detected by the speed detecting unit to control a speed of the electric motor,
wherein characteristics of the amplitude of the drive waveform corresponding to an output of the electric motor have a first region in which a relationship between an integrated value obtained by integrating an output voltage of the electric motor and a setting value of the amplitude is linear and a second region in which the relationship between the integrated value and the setting value of the amplitude is non-linear,
wherein the control unit holds data indicating the characteristics and performs correction on the setting value of the amplitude based on the data in the second region to suppress non-linearity of the setting value of the amplitude of the drive waveform and the output of the electric motor.

2. The electric motor control device according to claim 1, wherein the generating unit generates a drive waveform of a sine wave or a pseudo-trapezoidal wave in accordance with a frequency and the amplitude set by the control unit.

3. The electric motor control device according to claim 2, wherein the control unit performs the correction when the drive waveform of the pseudo-trapezoidal wave is generated by the generating unit.

4. The electric motor control device according to claim 3, wherein the generating unit outputs the drive waveform of the sine wave when the setting value of the amplitude is less than or equal to a threshold value, and outputs the drive waveform of the pseudo-trapezoidal wave when the setting value of the amplitude is greater than the threshold value.

5. The electric motor control device according to claim 1, wherein the control unit performs correction for suppressing non-linearity of a relationship between the setting value of the amplitude and rotational torque of the electric motor.

6. The electric motor control device according to claim 5, wherein the control unit identifies a relationship between the setting value of the amplitude and the rotational torque of the electric motor based on an advance angle state of the electric motor corresponding to a phase difference between the rotational phase detected by the position detecting unit and the phase of the drive waveform, determines correction characteristics corresponding to the advance angle state of the electric motor using the advance angle state when maximum rotational torque is generated as a reference, and sets the amplitude based on the correction characteristics.

7. The electric motor control device according to claim 6, wherein each of the correction characteristics indicates a setting value of an amplitude corresponding to the rotational torque of the electric motor, and the control unit determines characteristics in the advance angle state when the maximum rotational torque is generated and the correction characteristics from an advance angle value indicating the advance angle state of the electric motor.

8. The electric motor control device according to claim 1, wherein the control unit identifies a phase delay between a drive voltage waveform generated by the generating unit and a current waveform generated in an armature of the electric motor and sets the amplitude to correct the phase delay.

9. The electric motor control device according to claim 2, further comprising:
a memory configured to store individual difference information of speed characteristics of the electric motor,
wherein the control unit sets an amplitude in a region in which a relationship between the setting value of the amplitude and an integrated value obtained by integrating an output of the drive waveform is linear when it is determined that the target speed can be accomplished using a drive waveform of a sine wave from the individual difference information acquired from the storage unit and the target speed.

10. The electric motor control device according to claim 1, wherein the control unit controls the generating unit in accordance with the detected signal using the position detection unit to control the phase relationship between the rotational phase of the electric motor and the phase of the drive waveform.

11. An electric motor system comprising an electric motor control device and an electric motor, the electric motor control device comprising:
at least one processor or circuit programmed to function as:
a generating unit configured to generate a drive waveform to an electric motor;
a position detecting unit configured to detect a rotational phase of the electric motor and to output a detected signal;
a speed detecting unit configured to detect information of a rotational speed of the electric motor based on the detected signal output by the position detecting unit; and
a control unit configured to control a phase relationship between the rotational phase of the electric motor and a phase of the drive waveform and set an amplitude of the drive waveform corresponding to a difference between a target speed and the information of rotational speed detected by the speed detecting unit to control a speed of the electric motor,
wherein characteristics of the amplitude of the drive waveform corresponding to an output of the electric motor have a first region in which a relationship between an integrated value obtained by integrating an output voltage of the electric motor and a setting value of the amplitude is linear and a second region in which the relationship between the integrated value and the setting value of the amplitude is non-linear,
wherein the control unit holds data indicating the characteristics and performs correction on the setting value of the amplitude based on the data in the second region to suppress non-linearity of the setting value of the amplitude of the drive waveform and the output of the electric motor.

12. An electric motor control method which controls an electric motor, the electric motor control method comprising:
generating a drive waveform to an electric motor;
detecting a rotational phase of the electric motor and outputting a detected signal;
detecting an information of rotational speed of the electric motor based on the detected signal detected in the detecting;
controlling a phase relationship between the rotational phase of the electric motor and a phase of the drive waveform and setting an amplitude of a drive waveform corresponding to a difference between a target speed and the information of rotational speed detected by the speed detection step to control a speed,
wherein characteristics of the amplitude of the drive waveform corresponding to an output of the electric motor have a first region in which a relationship between an integrated value obtained by integrating an output voltage of the electric motor and a setting value of the amplitude is linear and a second region in which the relationship between the integrated value and the setting value of the amplitude is non-linear, and
wherein, in the controlling, the setting value of the amplitude of the drive waveform is corrected based on data indicating the characteristics in the second region to suppress non-linearity of the setting value of the amplitude of the drive waveform and the output of the electric motor.

\* \* \* \* \*